(12) United States Patent
Kang et al.

(10) Patent No.: US 11,729,779 B2
(45) Date of Patent: Aug. 15, 2023

(54) METHOD AND DEVICE FOR TRANSMITTING AND RECEIVING SCHEDULING REQUEST IN WIRELESS COMMUNICATION SYSTEM

(71) Applicant: LG ELECTRONICS INC., Seoul (KR)

(72) Inventors: Jiwon Kang, Seoul (KR); Eunjong Lee, Seoul (KR); Hyunho Lee, Seoul (KR)

(73) Assignee: LG ELECTRONINCS INC., Seoul (KR)

( * ) Notice: Subject to any disclaimer, the term of this patent is extended or adjusted under 35 U.S.C. 154(b) by 0 days.

(21) Appl. No.: 17/563,504

(22) Filed: Dec. 28, 2021

(65) Prior Publication Data

US 2022/0124777 A1  Apr. 21, 2022

Related U.S. Application Data

(63) Continuation of application No. PCT/KR2020/008424, filed on Jun. 29, 2020.

(60) Provisional application No. 62/886,313, filed on Aug. 13, 2019, provisional application No. 62/867,969, filed on Jun. 28, 2019.

(51) Int. Cl.
   *H04W 72/21*   (2023.01)

(52) U.S. Cl.
   CPC .................................. *H04W 72/21* (2023.01)

(58) Field of Classification Search
   CPC ........................ H04W 72/1284; H04W 72/21
   See application file for complete search history.

(56) References Cited

U.S. PATENT DOCUMENTS

| | | | |
|---|---|---|---|
| 2011/0205981 | A1 | 8/2011 | Koo et al. |
| 2019/0230690 | A1* | 7/2019 | Akkarakaran ........ H04L 5/0051 |
| 2019/0306875 | A1* | 10/2019 | Zhou .................. H04W 72/1284 |
| 2020/0145280 | A1* | 5/2020 | Cirik .................. H04W 72/0413 |
| 2020/0228248 | A1* | 7/2020 | Islam .................... H04L 1/1861 |

(Continued)

FOREIGN PATENT DOCUMENTS

| | | |
|---|---|---|
| WO | WO2017024516 | 2/2017 |
| WO | WO2017150925 | 9/2017 |
| WO | WO2018230862 | 12/2018 |

OTHER PUBLICATIONS

ETSI, "5G; NR; Physical layer procedures for control (3GPP TS 38.213 version 15.6.0 Release 15)," TS 138 213 V15.6.0, Jul. 2019, 110 pages.

(Continued)

*Primary Examiner* — Jasper Kwoh
(74) *Attorney, Agent, or Firm* — Fish & Richardson P.C.

(57) ABSTRACT

A method for transmitting a scheduling request (SR) by a terminal in a wireless communication system according to one embodiment of the present specification comprises: a step for receiving setting information related to an SR; and a step for transmitting at least one SR on the basis of the setting information. On the basis of the at least one SR overlapping with a different type of uplink control information (UCI), a UCI bit in which a specific field related to the at least one SR and the different type of UCI are combined is transmitted. On the basis of the at least one SR being related to beam failure recovery (BFR), the specific field indicates the beam failure recovery.

10 Claims, 20 Drawing Sheets

(56) References Cited

U.S. PATENT DOCUMENTS

| | | | |
|---|---|---|---|
| 2020/0313746 A1* | 10/2020 | Bai | H04L 5/001 |
| 2020/0314722 A1* | 10/2020 | Kyung | H04W 74/0833 |
| 2021/0084643 A1* | 3/2021 | Gao | H04W 72/0413 |
| 2022/0158794 A1* | 5/2022 | Zhang | H04L 5/0051 |

OTHER PUBLICATIONS

Intel Corporation, "Summary on L1-SINR and SCell BFR," R1-1907674, Presented at 3GPP TSG RAN WG1 Meeting #97, Reno, USA, May 13-17, 2019, 22 pages.

International Search Report in International Appln. No. PCT/KR2020/008424, dated Sep. 21, 2020, 5 pages (with English translation).

LG Electronics Inc., "Enhanced beam failure detection operation for NR-U," R2-1906743 (Revision of R2-1903736), Presented at 3GPP TSG-RAN WG2 Meeting #106, Reno, USA, May 13-17, 2019, 2 pages.

Extended European Search Report in European Appln. No. 20832812.0, dated Aug. 2, 2022, 10 pages.

* cited by examiner

【FIG. 1】
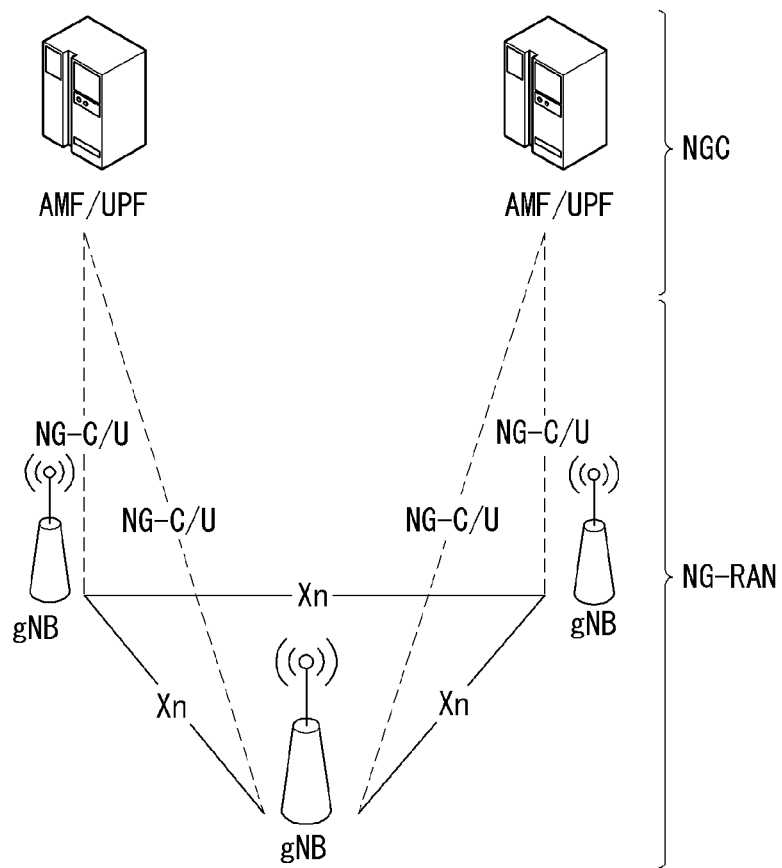
【FIG. 2】
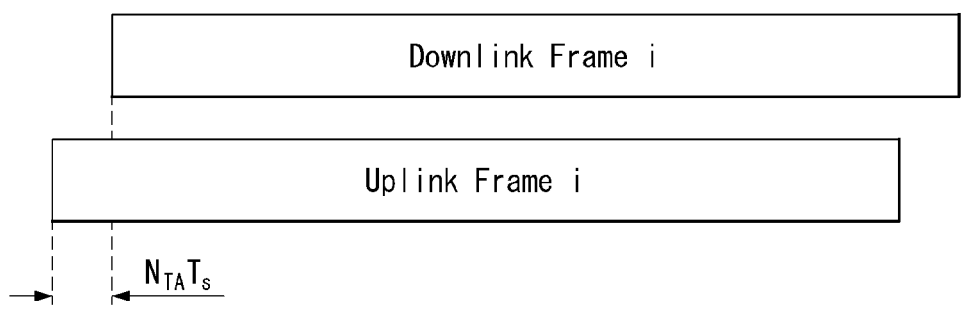

[FIG. 3]
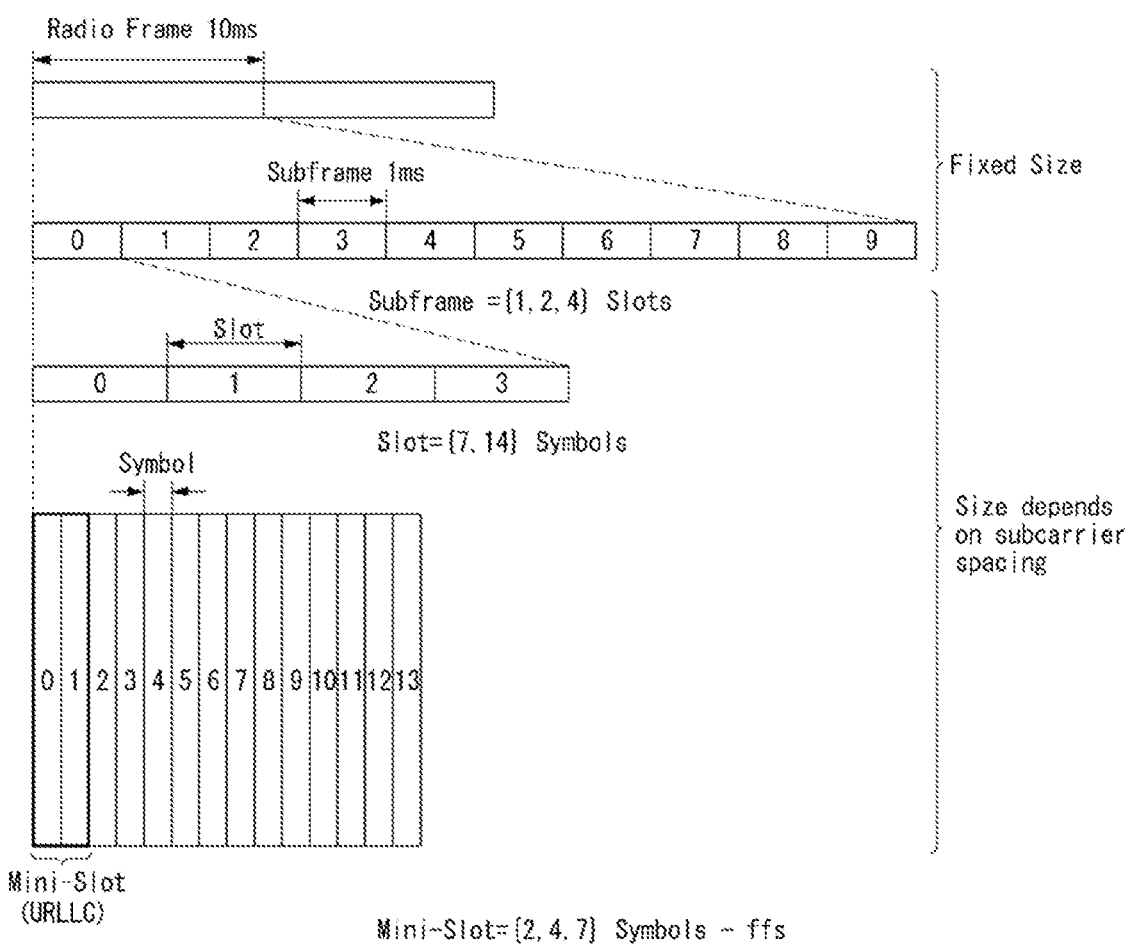

[FIG. 4]
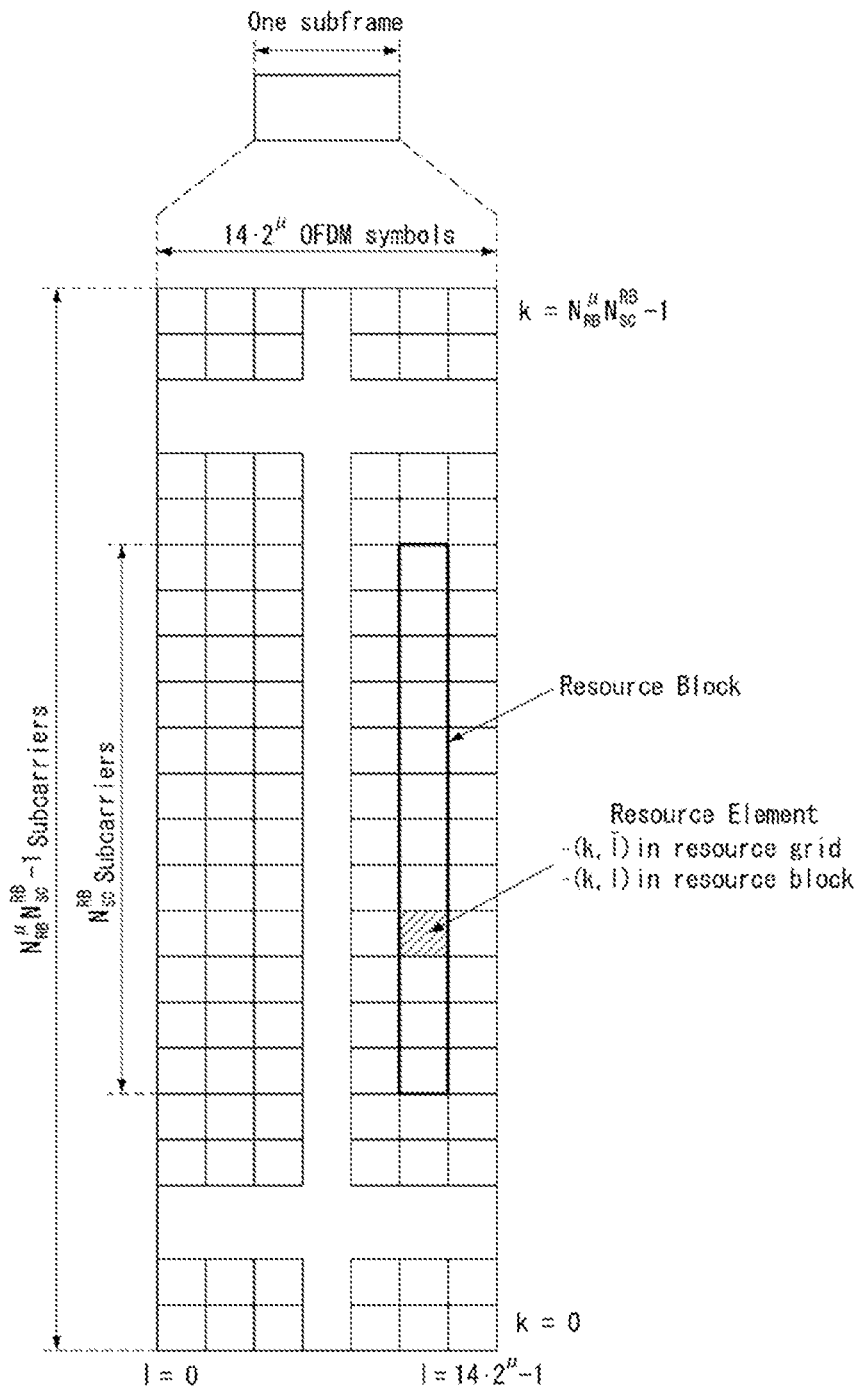

[FIG. 5]
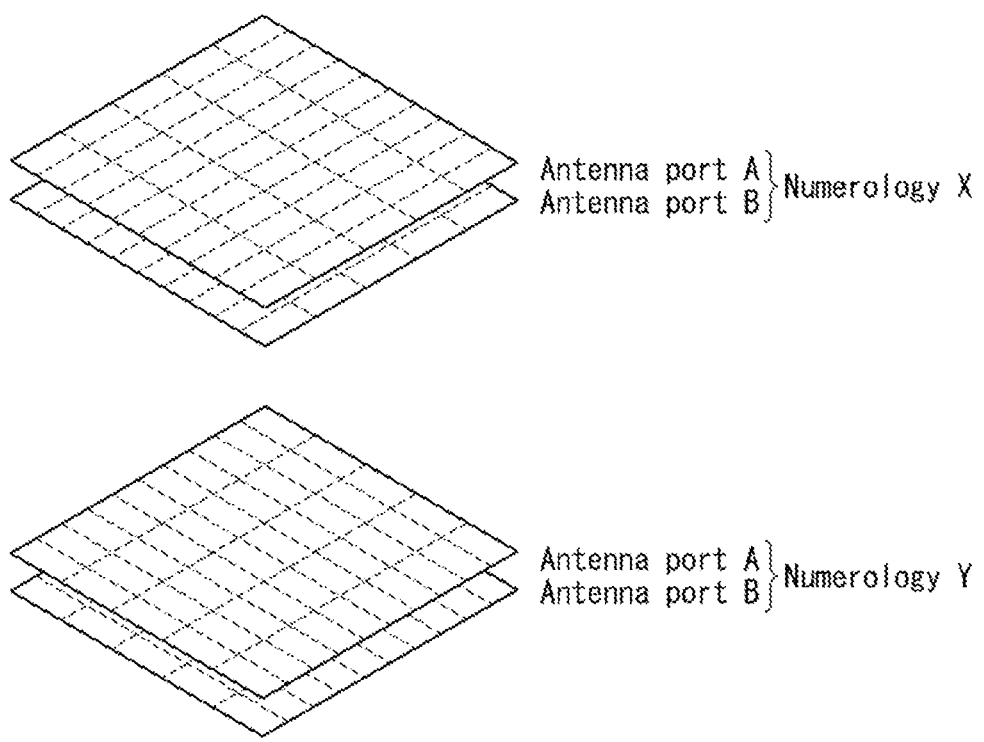

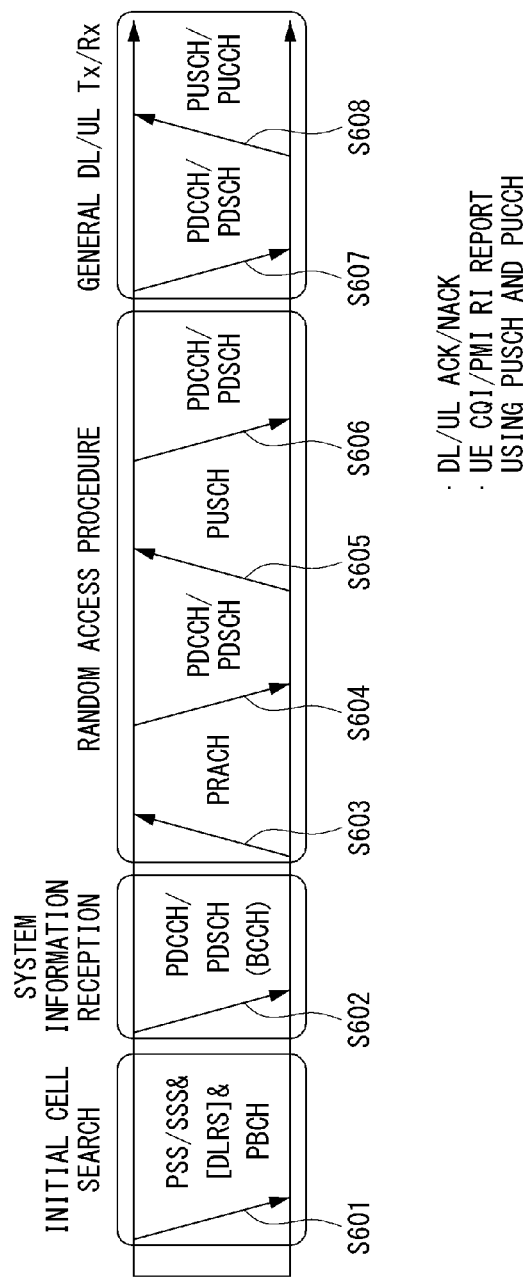
[ FIG. 6 ]

[FIG. 7]
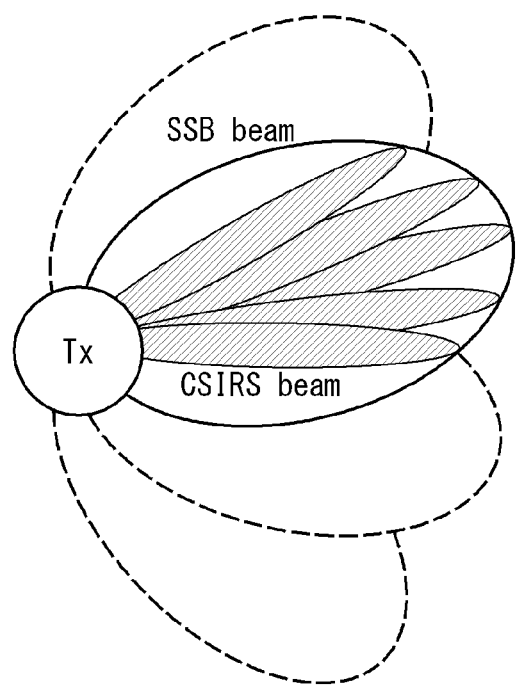

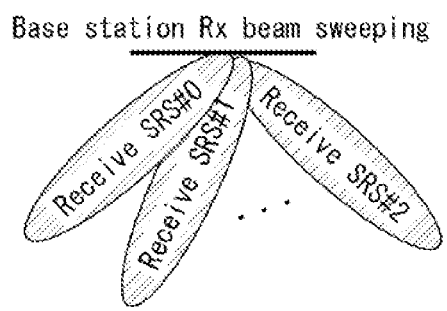
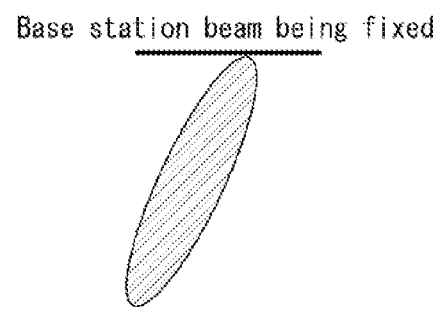
[FIG. 8A]  [FIG. 8B]

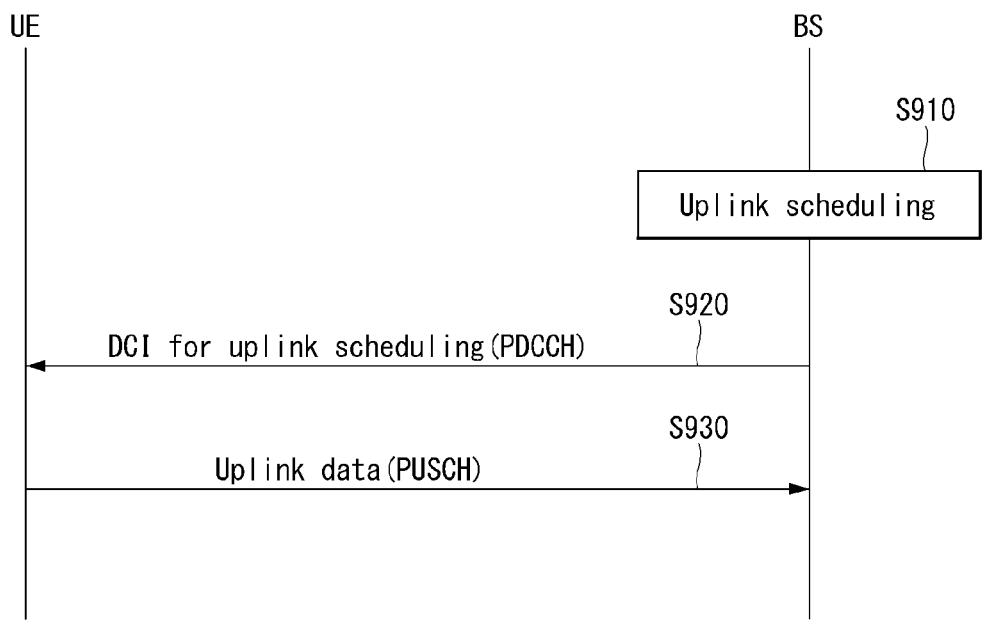
[FIG. 9]

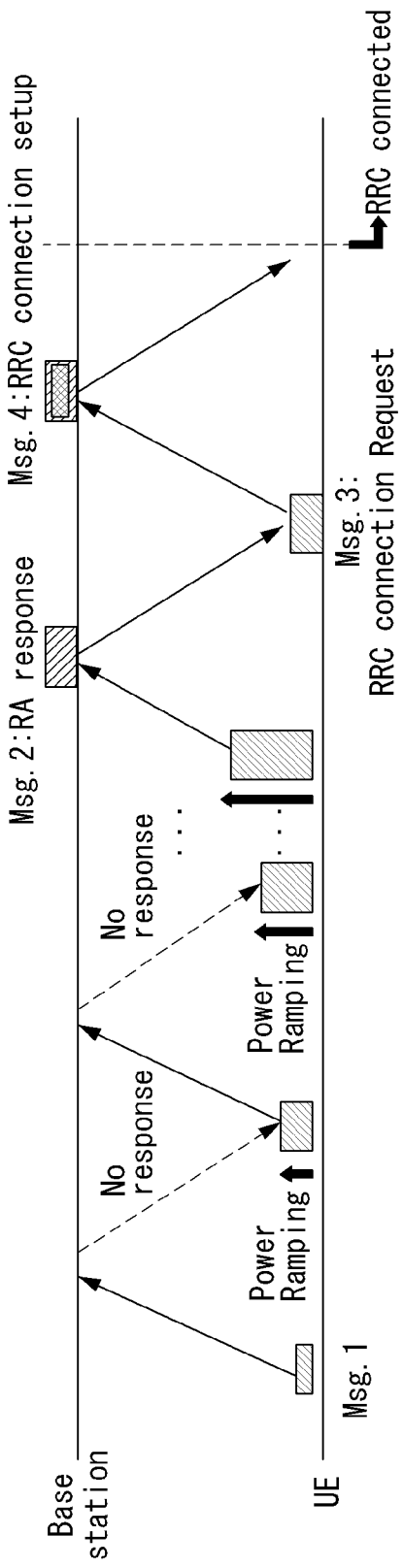
[ FIG. 10 ]

[FIG. 11]
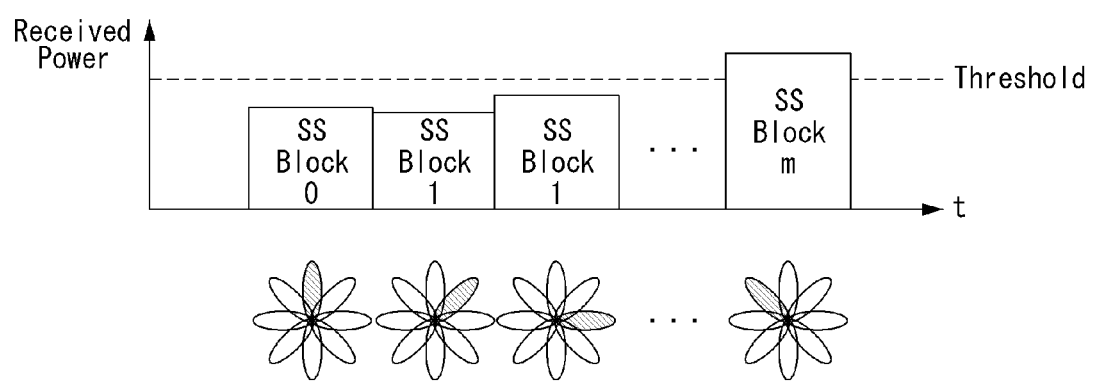

[FIG. 12]
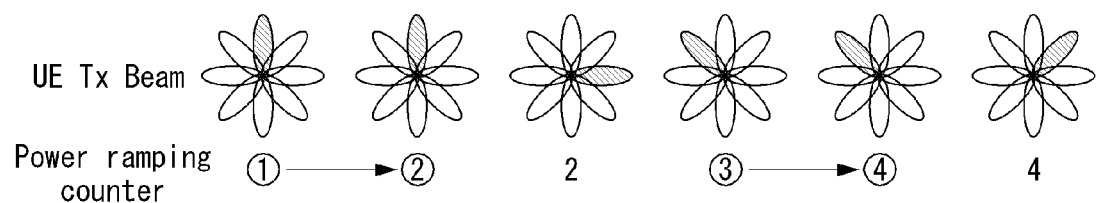

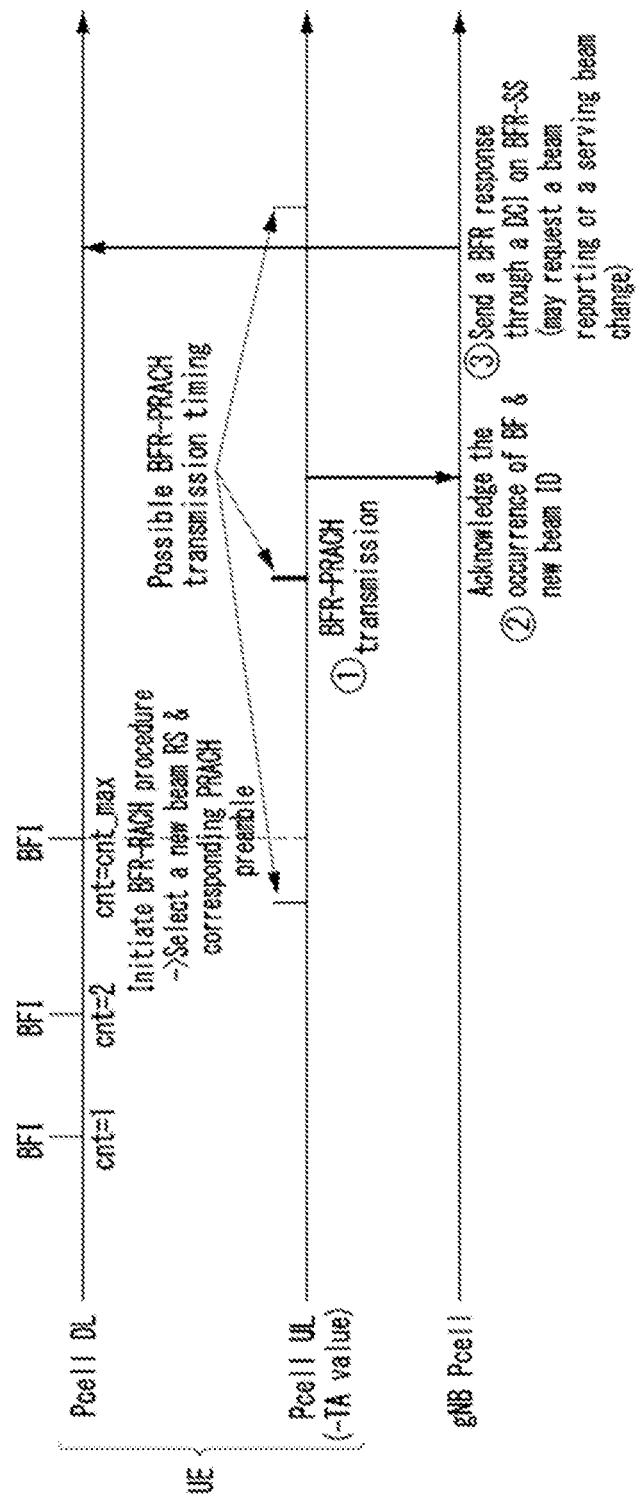
[FIG. 13]

[FIG. 14]
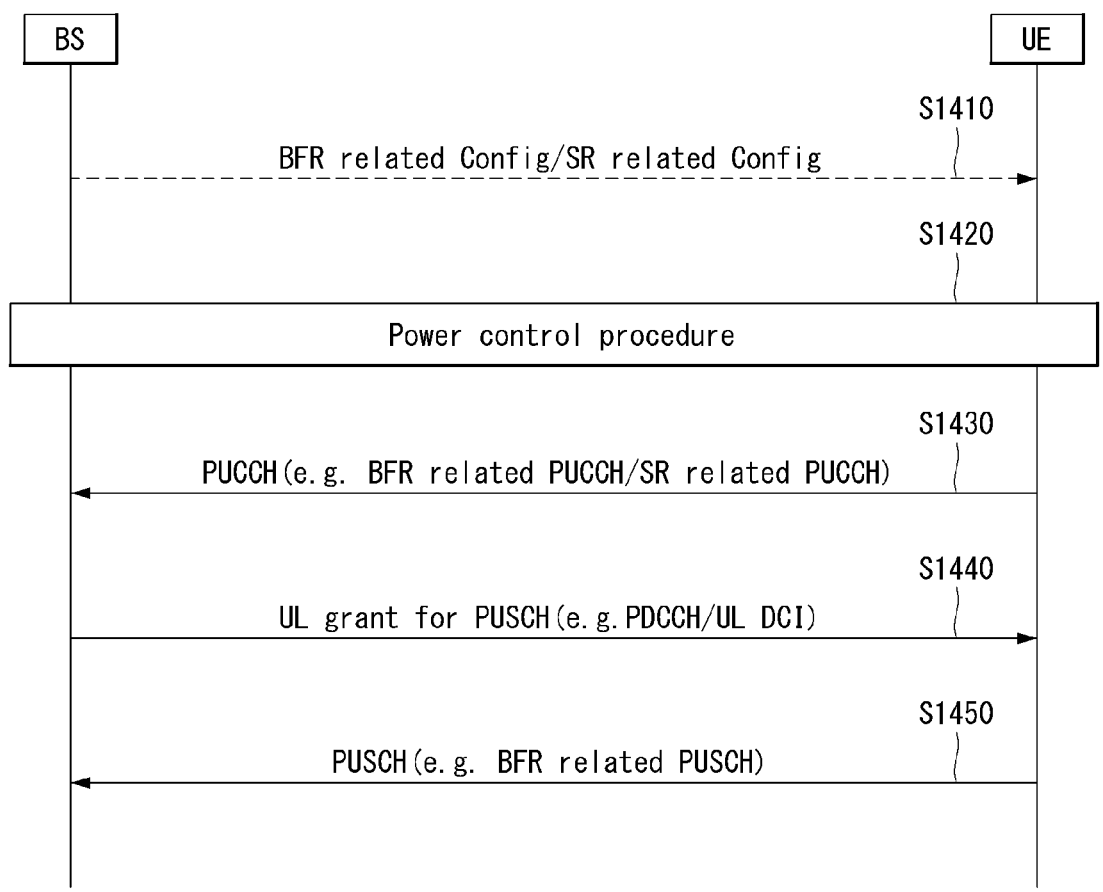

[FIG. 15]
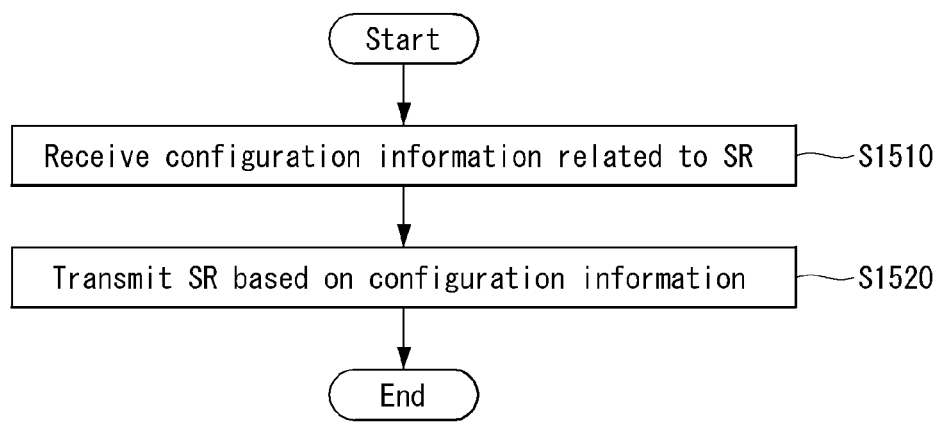

[FIG. 16]
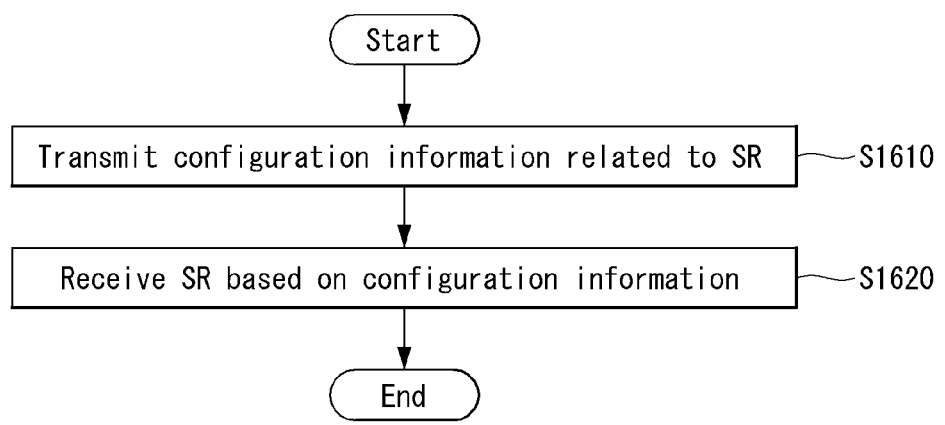

[FIG. 17]
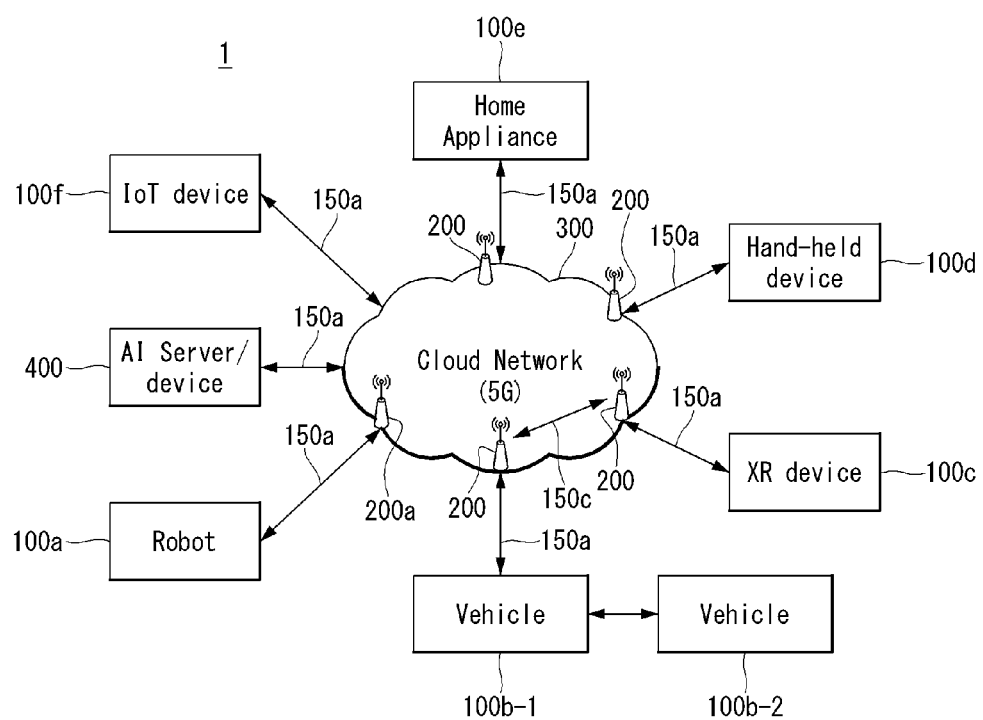

【FIG. 18】
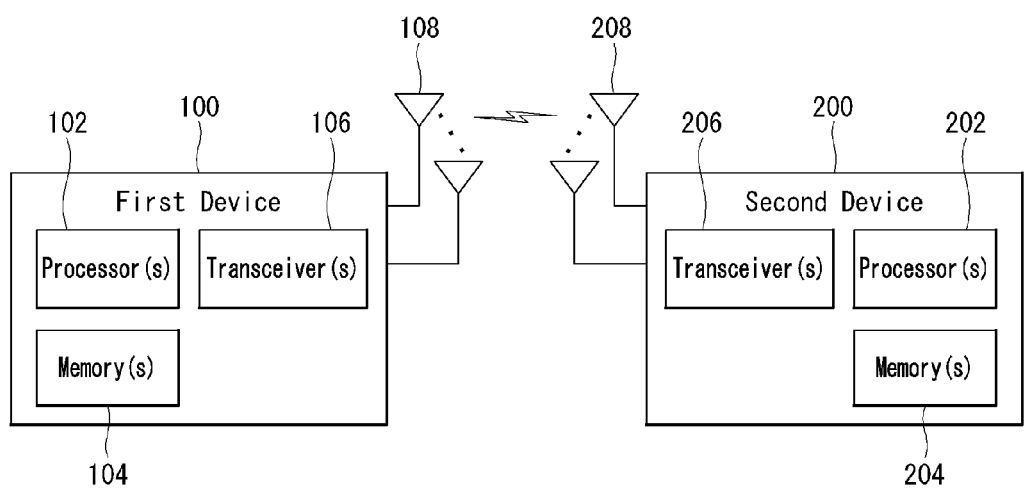

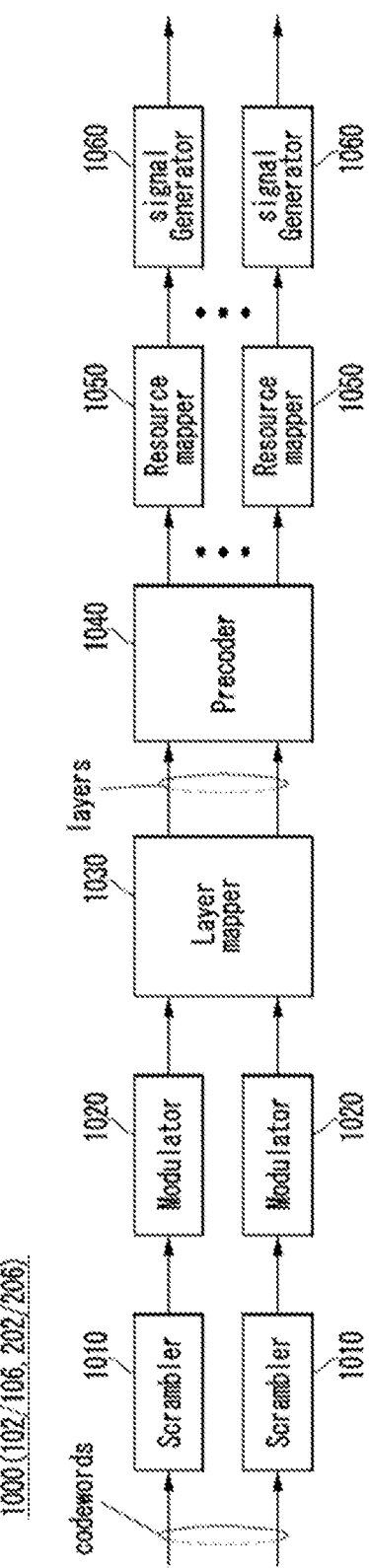
[ FIG. 19 ]

[FIG. 20]
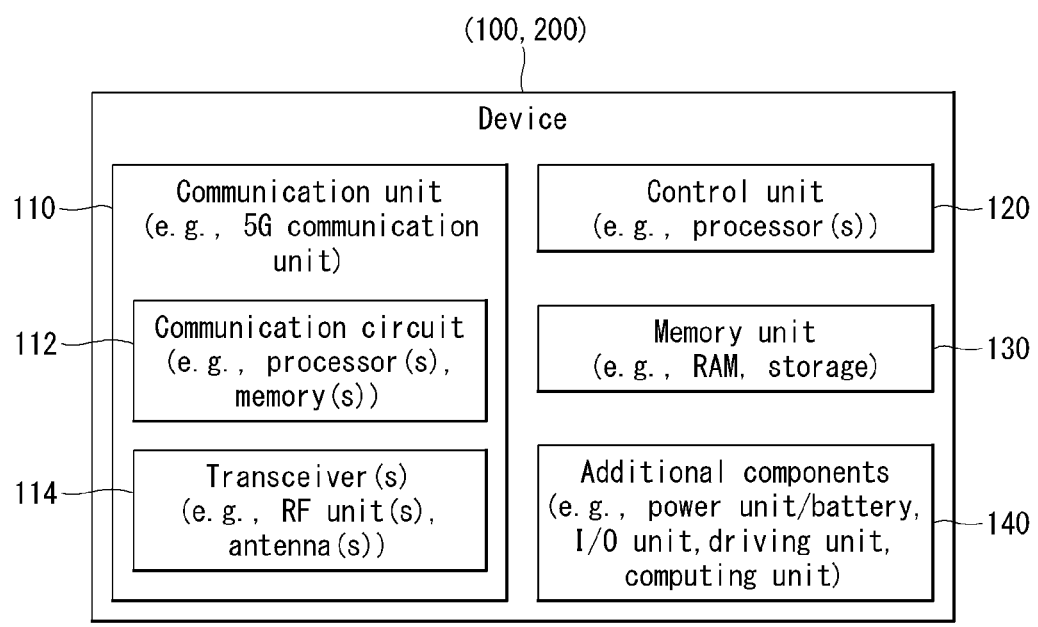

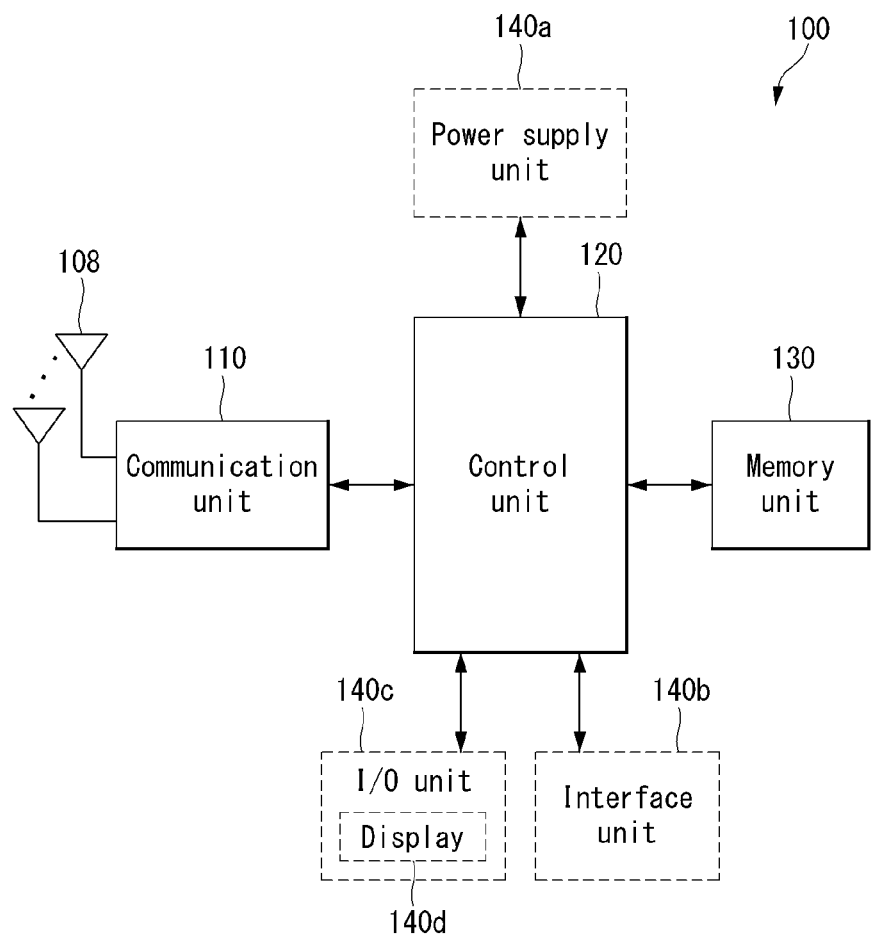
[FIG. 21]

METHOD AND DEVICE FOR TRANSMITTING AND RECEIVING SCHEDULING REQUEST IN WIRELESS COMMUNICATION SYSTEM

CROSS-REFERENCE TO RELATED APPLICATIONS

This application is a continuation of International Application No. PCT/KR2020/008424, filed on Jun. 29, 2020, which claims the benefit of U.S. Provisional Application No. 62/867,969, filed on Jun. 28, 2019, No. 62/886,313, filed on Aug. 13, 2019, the contents of which are all hereby incorporated by reference herein in their entireties.

TECHNICAL FIELD

The present disclosure relates to a method and apparatus for transmitting and receiving scheduling requests in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY

The present disclosure proposes a method of transmitting and receiving scheduling requests.

A PRACH-based BFR procedure to which a carrier aggregation (CA) is applied is limitedly applied to a primary cell (PCell) or a primary-secondary cell (PSCell). The reason for this is that an UL carrier may not be present in a secondary cell (SCell) and a contention based PRACH cannot be configured.

Accordingly, the present disclosure proposes a method of transmitting and receiving scheduling requests for reporting beam failure recovery of a secondary cell (SCell).

Technical objects to be achieved by the present disclosure are not limited to the aforementioned technical objects, and other technical objects not described above may be evidently understood by a person having ordinary knowledge in the art to which the present disclosure pertains from the following detailed description of the present disclosure.

A method of transmitting, by a user equipment, a scheduling request (SR) in a wireless communication system according to an embodiment of the present disclosure includes receiving configuration information related to the SR and transmitting at least one SR based on the configuration information.

Based on the at least one SR overlapping uplink control information (UCI) having another type, uplink control information (UCI) bits in which a specific field related to the at least one SR and the UCI having another type are combined are transmitted. Based on the at least one SR being related to beam failure recovery (BFR), the specific field represents the beam failure recovery.

Based on the specific field representing a positive SR, the positive SR is related to one SR based on the at least one SR. Based on the specific field representing a negative SR, the negative SR is related to all SRs based on the at least one SR.

The UCI having another type may be based on at least one of HARQ information or channel state information (CSI).

The number of bits of the specific field may be based on a number of the at least one SR.

Values of the specific field according to the number of bits may be related to any one of a positive SR for a specific SR, a negative SR for all SRs and BFR or the beam failure recovery (BFR) based on a preset order.

The preset order may be based on an ID related to the at least one SR.

The number of bits of the specific field may be based on the number of bits based on the number of the at least one SR and a preset number of bits.

The values of the specific field may represent 1) the positive SR or the negative SR and 2) positive beam failure recovery (positive BFR) or negative beam failure recovery (negative BFR).

The beam failure recovery (BFR) may be related to a beam failure of at least one secondary cell (SCell).

The method may further include transmitting a message related to the beam failure recovery (BFR). The message may be based on a medium access control-control element (MAC-CE).

The MAC-CE may include a field for at least one of i) an ID of the at least one SCell or ii) information related to a new beam.

A UE transmitting a scheduling request (SR) in a wireless communication system according to another embodiment of the present disclosure includes one or more transceivers, one or more processors controlling the one or more transceivers, and one or more memories operately coupled to the one or more processors and configured to store instructions performing operations when a transmission of a scheduling request (SR) is executed by the one or more processors.

The operations include receiving configuration information related to a scheduling request (SR) and transmitting at least one SR based on the configuration information.

Based on the at least one SR overlapping uplink control information (UCI) having another type, uplink control information (UCI) bits in which a specific field related to the at least one SR and the UCI having another type are combined are transmitted.

Based on the at least one SR being related to beam failure recovery (BFR), the specific field represents the beam failure recovery.

The beam failure recovery (BFR) may be related to a beam failure of at least one secondary cell (SCell).

An apparatus according to still another embodiment of the present disclosure includes one or more memories and one or more processors functionally connected to the one or more memories.

The one or more processors are configured to enable the apparatus to receive configuration information related to a scheduling request (SR) and to transmit at least one SR based on the configuration information.

Based on the at least one SR overlapping uplink control information (UCI) having another type, uplink control information (UCI) bits in which a specific field related to the at least one SR and the UCI having another type are combined are transmitted.

Based on the at least one SR being related to beam failure recovery (BFR), the specific field represents the beam failure recovery.

One or more non-transitory computer-readable media according to still another embodiment of the present disclosure store one or more instructions.

One or more instructions executable by one or more processors are configured to enable a user equipment to receive configuration information related to a scheduling request (SR) and to transmit at least one SR based on the configuration information.

Based on the at least one SR overlapping uplink control information (UCI) having another type, uplink control information (UCI) bits in which a specific field related to the at least one SR and the UCI having another type are combined are transmitted.

Based on the at least one SR being related to beam failure recovery (BFR), the specific field represents the beam failure recovery.

According to an embodiment of the present disclosure, beam failure recovery (BFR) may be performed based on an SR. Accordingly, the beam failure recovery (BFR) can be effectively supported even for a secondary cell (SCell). Such an effect will be more significant a case where a high frequency band (e.g., 30 GHz) operates as a secondary cell (SCell).

In order to perform BFR through the SR, the transmission of the SR related to the BFR needs to be processed as having higher priority than another SR.

In relation this, according to an embodiment of the present disclosure, based on at least one SR being overlapped with uplink control information (UCI) having another type, UCI bits in which a specific field related to the at least one SR and the UCI having another type are combined are transmitted. Based on the at least one SR being related to beam failure recovery (BFR), the specific field represents the beam failure recovery.

Accordingly, if at least one SR (e.g., overlapped SRs) is multiplexed with another UCI, the occurrence of a beam failure may be first reported. Furthermore, when an SR event and a BFR event simultaneously occur, ambiguity in a UE operation can be solved, and a beam failure recovery procedure (BFR procedure) can be more quickly initiated.

According to an embodiment of the present disclosure, the number of bits of the specific field may be based on the number of at least one SR. Values of the specific field according to the number of bits may be related to any one of a positive SR for a specific SR, a negative SR for all SRs and BFR or beam failure recovery (BFR) based on a preset order.

A positive SR or beam failure recovery can be represented through one field, so that a BFR procedure can be initiated based on the existing SR field.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIGS. 8A and 8B illustrate an example of a UL BM procedure using an SRS.

FIG. 9 illustrates an uplink transmission/reception operation to which the method proposed in this disclosure may be applied.

FIG. 10 illustrates an example of a random access procedure.

FIG. 11 is a diagram for explaining the concept of a threshold value for an SS block for RACH resource association.

FIG. 12 is a diagram for explaining a ramping counter of a PRACH.

FIG. 13 is a diagram for describing a beam failure recovery-related operation to which a method proposed in the present disclosure may be applied.

FIG. 14 illustrates an example of signaling between a UE/base station to which a method proposed in the present disclosure may be applied.

FIG. 15 is a flowchart for describing a method of transmitting, by a UE, a scheduling request in a wireless communication system according to an embodiment of the present disclosure.

FIG. 16 is a flowchart for describing a method of receiving, by a base station, a scheduling request in a wireless communication system according to another embodiment of the present disclosure.

FIG. 17 illustrates a communication system 1 applied to the present disclosure.

FIG. 18 illustrates wireless devices applicable to the present disclosure.

FIG. 19 illustrates a signal processing circuit applied to the present disclosure.

FIG. 20 illustrates another example of a wireless device applied to the present disclosure.

FIG. 21 illustrates a hand-held device applied to the present disclosure.

DETAILED DESCRIPTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) a ULtra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences.

Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s = 1/(\Delta f_{max} \cdot N_f)$ where $\Delta f_{max} = 480 \cdot 10^3$, and $N_f = 4096$. Downlink and uplink transmissions is constituted of a radio frame with a period of $T_f = (\Delta f_{max} N_f/100) \cdot T_s = 10$ ms. Here, the radio frame is constituted of 10 subframes each of which has a period of $T_{sf} = (\Delta f_{max} N_f/1000) \cdot T_s = 1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA} = N_{TA} T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu}N_{sc}^{RB}$−1 is an index on a frequency domain, and l̄=0, . . . , $2^{\mu}N_{symb}^{(\mu)}$−1 refers to a location of a symbol in a subframe. The index pair (k,l̄) is used to refer to a resource element in a slot, where l=0, . . . $N_{symb}^{\mu}$−1.

The resource element (k,l̄) for the numerology μ and the antenna port p corresponds to a complex value $\alpha_{k,\bar{l}}^{(p,\mu)}$. When there is no risk for confusion or when a specific antenna port or numerology is not specified, the indexes p and μ may be dropped, and as a result, the complex value may be $\alpha_{k,\bar{l}}^{(p)}$ or $\alpha_{k,\bar{l}}$.

Further, a physical resource block is defined as $N_{sc}^{RB}$=12 consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k,l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}$−1, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=           SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServCellIndex
    bwp-Id                  BWP-Id
    referenceSignal         CHOICE {
        csi-rs                  NZP-CSI-RS-ResourceId,
        ssb                     SSB-Index
    },
    qcl-Type                ENUMERATED {typeA, typeB, typeC, typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with $K \geq 1$ SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIGS. 8A and 8B illustrates an example of a UL BM procedure using a SRS.

More specifically, FIG. 8A illustrates an Rx beam determination procedure of a base station, and FIG. 8A illustrates a Tx beam sweeping procedure of a UE.

FIG. 9 illustrates an uplink transmission/reception operation to which the method proposed in this disclosure may be applied.

Referring to FIG. 9, a BS schedules uplink transmission such as a frequency/time resource, a transport layer, an uplink precoder, and an MCS (S910). In particular, the BS may determine a beam for a UE to transmit a PUSCH.

The UE receives a DCI for uplink scheduling (i.e., including scheduling information of the PUSCH) on a PDCCH from the BS (S920).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, 'spatialRelationInfo' may be set for each SRS resource, and the value may be one of {CRI, SSB, SRI}.

The UE transmits uplink data to the BS on PUSCH (S930).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

Random Access Related Procedure

The random access procedure of the UE can be summarized in Table 6 and FIG. 10.

TABLE 6

| | Type of Signals | Operations/Information Acquired |
|---|---|---|
| 1st step | PRACH preamble in UL | * Initial beam acquisition<br>* Random election of RA-preamble ID |
| 2nd Step | Random Access Response on DL-SCH | * Timing alignment information<br>* RA-preamble ID<br>* Initial UL grant, Temporary C-RNTI |
| 3rd Step | UL transmission on UL-SCH | * RRC connection request<br>* UE identifier |
| 4th Step | Contention Resolution on DL | * Temporary C-RNTI on PDCCH for initial access<br>* C-RNTI on PDCCH for UE in RRC_CONNECTED |

FIG. 10 illustrates an example of a random access procedure.

Firstly, the UE may transmit PRACH preamble in UL as Msg1 of the random access procedure.

Random access preamble sequences, of two different lengths are supported. Long sequence length 839 is applied with subcarrier spacings of 1.25 and 5 kHz and short sequence length 139 is applied with sub-carrier spacings 15, 30, 60 and 120 kHz. Long sequences support unrestricted sets and restricted sets of Type A and Type B, while short sequences support unrestricted sets only.

Multiple RACH preamble formats are defined with one or more RACH OFDM symbols, and different cyclic prefix and guard time. The PRACH preamble configuration to use is provided to the UE in the system information.

When there is no response to the Msg1, the UE may retransmit the PRACH preamble with power ramping within the prescribed number of times. The UE calculates the PRACH transmit power for the retransmission of the preamble based on the most recent estimate pathloss and power ramping counter. If the UE conducts beam switching, the counter of power ramping remains unchanged.

The system information informs the UE of the association between the SS blocks and the RACH resources.

FIG. 11 is a diagram for explaining the concept of a threshold value for an SS block for RACH resource association.

The threshold of the SS block for RACH resource association is based on the RSRP and network configurable. Transmission or retransmission of RACH preamble is based on the SS blocks that satisfy the threshold.

When the UE receives random access response on DL-SCH, the DL-SCH may provide timing alignment information, RA-preamble ID, initial UL grant and Temporary C-RNTI.

Based on this information, the UE may transmit UL transmission on UL-SCH as Msg3 of the random access procedure. Msg3 can include RRC connection request and UE identifier.

In response, the network may transmit Msg4, which can be treated as contention resolution message on DL. By receiving this, the UE may enter into RRC connected state.

Specific explanation for each of the steps is as follows:

Prior to initiation of the physical random access procedure, Layer 1 shall receive from higher layers a set of SS/PBCH block indexes and shall provide to higher layers a corresponding set of RSRP measurements.

Prior to initiation of the physical random access procedure, Layer 1 shall receive the following information from the higher layers:

Configuration of physical random access channel (PRACH) transmission parameters (PRACH preamble format, time resources, and frequency resources for PRACH transmission).

Parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the L1 random access procedure encompasses the transmission of random access preamble (Msg1) in a PRACH, random access response (RAR) message with a PDCCH/PDSCH (Msg2), and when applicable, the transmission of Msg3 PUSCH, and PDSCH for contention resolution.

If a random access procedure is initiated by a "PDCCH order" to the UE, a random access preamble transmission is with a same subcarrier spacing as a random access preamble transmission initiated by higher layers.

If a UE is configured with two UL carriers for a serving cell and the UE detects a "PDCCH order", the UE uses the UL/SUL indicator field value from the detected "PDCCH order" to determine the UL carrier for the corresponding random access preamble transmission.

Regarding the random access preamble transmission step, physical random access procedure is triggered upon request of a PRACH transmission by higher layers or by a PDCCH order. A configuration by higher layers for a PRACH transmission includes the following:

A configuration for PRACH transmission.

A preamble index, a preamble subcarrier spacing, $P_{PRACHtarget}$, a corresponding RA-RNTI, and a PRACH resource.

A preamble is transmitted using the selected PRACH format with transmission power $P_{PRACH,b,f,c}(i)$, on the indicated PRACH resource.

A UE is provided a number of SS/PBCH blocks associated with one PRACH occasion by the value of higher layer parameter SSB-perRACH-Occasion. If the value of SSB-perRACH-Occasion is smaller than one, one SS/PBCH block is mapped to 1/SSB-per-rach-occasion consecutive PRACH occasions. The UE is provided a number of preambles per SS/PBCH block by the value of higher layer parameter cb-preamblePerSSB and the UE determines a total number of preambles per SSB per PRACH occasion as the multiple of the value of SSB-perRACH-Occasion and the value of cb-preamblePerSSB.

SS/PBCH block indexes are mapped to PRACH occasions in the following order.

First, in increasing order of preamble indexes within a single PRACH occasion.

Second, in increasing order of frequency resource indexes for frequency multiplexed PRACH occasions.

Third, in increasing order of time resource indexes for time multiplexed PRACH occasions within a PRACH slot.

Fourth, in increasing order of indexes for PRACH slots.

The period, starting from frame 0, for the mapping of SS/PBCH blocks to PRACH occasions is the smallest of {1, 2, 4} PRACH configuration periods that is larger than or equal to $\lceil N_{Tx}^{SSB}/N_{PRACHperiod}^{SSB} \rceil$, where the UE obtains $N_{Tx}^{SSB}$ from higher layer parameter SSB-transmitted-SIB1 and $N_{PRACH\,period}^{SSB}$ is the number of SS/PBCH blocks that can be mapped to one PRACH configuration period.

If a random access procedure is initiated by a PDCCH order, the UE shall, if requested by higher layers, transmit a PRACH in the first available PRACH occasion for which a time between the last symbol of the PDCCH order reception and the first symbol of the PRACH transmission is larger than or equal to $N_{T,2}+\Delta_{BWPSwitching}+\Delta_{Delay}$ msec where $N_{T,2}$ is a time duration of $N_2$ symbols corresponding to a PUSCH preparation time for PUSCH processing capability 1, $\Delta_{BWPSwitching}$ is pre-defined, and $\Delta_{Delay}>0$.

In response to a PRACH transmission, a UE attempts to detect a PDCCH with a corresponding RA-RNTI during a window controlled by higher layers. The window starts at the first symbol of the earliest control resource set the UE is configured for Type1-PDCCH common search space that is at least $\lceil \Delta \cdot N_{slot}^{subframe,\mu} \cdot N_{symb}^{slot}/T_{sf} \rceil$ symbols after the last symbol of the preamble sequence transmission. The length of the window in number of slots, based on the subcarrier spacing for Type0-PDCCH common search space is provided by higher layer parameter rar-WindowLength.

If a UE detects the PDCCH with the corresponding RA-RNTI and a corresponding PDSCH that includes a DL-SCH transport block within the window, the UE passes the transport block to higher layers. The higher layers parse the transport block for a random access preamble identity (RAPID) associated with the PRACH transmission. If the higher layers identify the RAPID in RAR message(s) of the DL-SCH transport block, the higher layers indicate an uplink grant to the physical layer. This is referred to as random access response (RAR) UL grant in the physical layer. If the higher layers do not identify the RAPID associated with the PRACH transmission, the higher layers can indicate to the physical layer to transmit a PRACH. A minimum time between the last symbol of the PDSCH reception and the first symbol of the PRACH transmission is equal to $N_{T,1}+\Delta_{new}+0.5$ msec where $N_{T,1}$ is a time duration of $N_1$ symbols corresponding to a PDSCH reception time for PDSCH processing capability 1 when additional PDSCH DM-RS is configured and $\Delta_{new}\geq 0$.

A UE shall receive the PDCCH with the corresponding RA-RNTI and the corresponding PDSCH that includes the DL-SCH transport block with the same DM-RS antenna port quasi co-location properties, as for a detected SS/PBCH block or a received CSI-RS. If the UE attempts to detect the PDCCH with the corresponding RA-RNTI in response to a PRACH transmission initiated by a PDCCH order, the UE assumes that the PDCCH and the PDCCH order have same DM-RS antenna port quasi co-location properties.

A RAR UL grant schedules a PUSCH transmission from the UE (Msg3 PUSCH). The contents of the RAR UL grant, starting with the MSB and ending with the LSB, are given in Table 7. Table 7 shows random access response grant content field size.

TABLE 7

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In case of frequency hopping, based on the indication of the frequency hopping flag field, the first one or two bits, $N_{UL,hop}$ bits, of the Msg3 PUSCH frequency resource allocation field are used as hopping information bits as described in following [Table I.5].

The MCS is determined from the first sixteen indices of the applicable MCS index table for PUSCH.

The TPC command $\delta_{msg2,b,f,c}$ is used for setting the power of the Msg3 PUSCH, and is interpreted according to Table 8. Table 8 shows TPC command $\delta_{msg2,b,f,c}$ for Msg3 PUSCH.

TABLE 8

| TPC command | Value(in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In non-contention based random access procedure, the CSI request field is interpreted to determine whether an aperiodic CSI report is included in the corresponding PUSCH transmission. In contention based random access procedure, the CSI request field is reserved.

Unless a UE is configured a subcarrier spacing, the UE receives subsequent PDSCH using same subcarrier spacing as for the PDSCH reception providing the RAR message.

If a UE does not detect the PDCCH with a corresponding RA-RNTI and a corresponding DL-SCH transport block within the window, the UE performs the procedure for random access response reception failure.

For example, the UE may perform power ramping for retransmission of the Random Access Preamble based on a power ramping counter. However, the power ramping counter remains unchanged if a UE conducts beam switching in the PRACH retransmissions as shown in FIG. 12.

FIG. 12 is a diagram for explaining a ramping counter of a PRACH.

In FIG. 12, the UE may increase the power ramping counter by 1, when the UE retransmit the random access preamble for the same beam. However, when the beam had been changed, the power ramping counter remains unchanged.

Regarding Msg3 PUSCH transmission, higher layer parameter msg3-tp indicates to a UE whether or not the UE shall apply transform precoding, for an Msg3 PUSCH transmission. If the UE applies transform precoding to an Msg3 PUSCH transmission with frequency hopping, the frequency offset for the second hop is given in Table 9. Table 9 shows frequency offset for second hop for Msg3 PUSCH transmission with frequency hopping.

TABLE 9

| Number of PRBs in initial active UL BWP | Value of $V_{UL,\ hop}$ Hopping Bits | Frequency offset for $2^{nd}$ hop |
| --- | --- | --- |
| $N_{BWP}^{size} < 50$ | 0 | $N_{BWP}^{size}/2$ |
|  | 1 | $N_{BWP}^{size}/4$ |
| $N_{BWP}^{size} > 50$ | 00 | $N_{BWP}^{size}/2$ |
|  | 01 | $N_{BWP}^{size}/4$ |
|  | 10 | $-N_{BWP}^{size}/4$ |
|  | 11 | reserved |

The subcarrier spacing for Msg3 PUSCH transmission is provided by higher layer parameter msg3-scs. A UE shall transmit PRACH and Msg3 PUSCH on a same uplink carrier of the same serving cell. An UL BWP for Msg3 PUSCH transmission is indicated by SystemInformationBlockType1.

A minimum time between the last symbol of a PDSCH reception conveying a RAR and the first symbol of a corresponding Msg3 PUSCH transmission scheduled by the RAR in the PDSCH for a UE when the PDSCH and the PUSCH have a same subcarrier spacing is equal to $N_{T,1} + N_{T,2} + N_{TA,max} + 0.5$ msec. $N_{T,1}$ is a time duration of $N_1$ symbols corresponding to a PDSCH reception time for PDSCH processing capability 1 when additional PDSCH DM-RS is configured, $N_{T,2}$ is a time duration of $N_2$ symbols corresponding to a PUSCH preparation time for PUSCH processing capability 1, and $N_{TA,max}$ is the maximum timing adjustment value that can be provided by the TA command field in the RAR.

In response to an Msg3 PUSCH transmission when a UE has not been provided with a C-RNTI, the UE attempts to detect a PDCCH with a corresponding TC-RNTI scheduling a PDSCH that includes a UE contention resolution identity. In response to the PDSCH reception with the UE contention resolution identity, the UE transmits HARQ-ACK information in a PUCCH. A minimum time between the last symbol of the PDSCH reception and the first symbol of the corresponding HARQ-ACK transmission is equal to $N_{T,1} + 0.5$ msec. $N_{T,1}$ is a time duration of $N_1$ symbols corresponding to a PDSCH reception time for PDSCH processing capability 1 when additional PDSCH DM-RS is configured.

Beam Failure Recovery (BFR)

In performing a DL/UL beam management process, a beam mismatch problem may occur depending on configured periodicity of beam management. In particular, if a radio channel environment is changed because a UE moves its location or rotates or due to a movement of a surrounding object (e.g., an LoS environment is changed into a non-LoS environment because a beam is blocked), an optimum DL/UL beam pair may be changed. In general, such a change may be said that a beam failure event has occurred when tracking fails in a beam management process performed by network indication. A UE may determine whether such a beam failure event occurs through reception quality of a downlink RS. A report message for such a situation or a message (called a beam failure recovery request (BFRQ) message) for a beam recovery request needs to be delivered from a UE. A base station that has received such a message may perform beam recovery through various processes, such as beam RS transmission or a beam reporting request for the beam recovery. Such a series of beam recovery process is called beam failure recovery (BFR). In Rel-15 NR, a beam failure recovery (BFR) process for a PCell or a PScell (both are special cells (also called an SpCell)) in which a contention based PRACH resource is always present has been standardized. The corresponding procedure is an operation within a serving cell, is configured as follows as a beam failure detection (BFD) process of a UE, a BFRQ process, and a process of monitoring, by a UE, a response of a base station to a BFRQ (Reference: 3GPP TS38.213, TS38.321, TS38.331).

Beam Failure Detection (BFD)

If all PDCCH beams have a predetermined quality value (Q_out) or less, it is said that one beam failure instance has occurred (in this case, the quality is based on a hypothetical block error rate (BLER): That is, assuming that control information has been transmitted in a corresponding PDCCH, the probability that the demodulation of corresponding information will fail.

In this case, one or a plurality of search spaces in which a PDCCH will be monitored may be configured in a UE. All the PDCCH beams may be differently configured for each search space. In this case, this means that all the beams have a BLER threshold or less. The following two methods are supported as a criterion for determining, by a UE, a BFD RS.

[Implicit configuration of BFD RSs] a control resource set (refer to CORESET [TS38.213, TS38.214, TS38.331]) ID, that is, a resource region in which a PDCCH may be transmitted is configured in each search space. QCLed RS information (e.g., CSI-RS resource ID, SSB ID) from a spatial RX parameter viewpoint may be indicated/configured for each CORESET ID (in the NR standard, a QCLed RS is indicated/configured through transmit configuration information indication). In this case, the QCLed RS (i.e., QCL Type D in TS38.214) from the spatial RX parameter viewpoint means that a method of notifying, by a base station, a UE that the UE has to use (or may use) a beam used in corresponding spatially QCLed RS reception in corresponding PDCCH DMRS reception. As a result, from a base station viewpoint, this method is a method of notifying a UE that the UE has to perform transmission by applying the same transmission beam or a similar transmission beam (e.g., when beam directions are the same/similar, but beam widths are different) between spatially QCLed antenna ports.

[Explicit configuration of BFD RSs] a base station may explicitly configure a beam RS(s) for the use (beam failure detection). In this case, a corresponding beam RS(s) corresponds to the 'all PDCCH beam'.

Whenever an event in which a hypothetical BLER measured based on a BFD RS(s) in a UE physical layer is deteriorate to a specific threshold or more occurs, what beam failure instance (BFI) has occurred is notified through a MAC sublayer. When a BFI occurs as much as a given number (beamFailureInstanceMaxCount) within a given time (BFD timer), a UE MAC sublayer determines that a beam failure has occurred and initiates a related RACH operation.

Hereinafter, a MAC layer operation related to BFD is described.

MAC entity:
1> when beam failure instance indication is received in lower layers:
2> starts or starts again beamFailureDetectionTimer.
2> increases BFI_COUNTER by 1.
2> when BFI_COUNTER>=beamFailureInstanceMaxCount:
3> initiate a random access procedure in a SpCell.
1> when beamFailureDetectionTimer expires; or
1> when beamFailureDetectionTimer, beamFailureInstanceMaxCount or a reference signal (any of the reference signals used for beam failure detection) used to detect a beam failure is reconfigured by a higher layer:
2> configures BFI_COUNTER to 0.
1> when a random access procedure is successfully completed:
2> configures BFI_COUNTER to 0.
2> stops (configured) beamFailureRecoveryTimer.
2> considers that the beam failure recovery procedure has been successfully completed.

BFRQ (Based on PRACH): New Beam Identification+ PRACH Transmission

As described above, when a specific number of BFIs or more occur, a UE may determine that a beam failure has occurred, and may perform a beam failure recovery operation. As an example of the beam failure recovery operation, a beam failure recovery request (BFRQ) operation based on a RACH procedure (i.e., PRACH) may be performed. Hereinafter, a corresponding BFRQ procedure is specifically described.

When a BF occurs in a corresponding UE, a base station may configure an RS list (candidateBeamRSList) corresponding to candidate beams which may be replaced as RRC. Dedicated PRACH resources may be configured for corresponding candidate beams. In this case, the dedicated PRACH resources are non-contention based PRACH (also called contention free PRACH) resources. If a beam is not found in the corresponding list, a beam is selected among pre-configured SSB resources and a contention based PRACH is transmitted. A detailed procedure is as follows.

Step 1) a UE finds a beam having a predetermined quality value (Q_in) or more among RSs configured as a candidate beam RS set by a base station.

If one beam RS is greater than a threshold, a corresponding beam RS is selected.

If a plurality of beam RSs is greater than a threshold, given one of the corresponding beam RSs is selected If a beam greater than a threshold is not present, Step 2 is performed.

Note 1: In this case, beam quality is based on RSRP.

Note 2: the RS beam set configured by the base station includes three cases.

1) All beam RSs within the RS beam set are configured as SSBs
2) All beam RSs within the RS beam set are configured as CSI-RS resources
3) Beam RSs within the RS beam set are configured as SSBs and CSI-RS resources Step 2) A UE finds a beam having a predetermined quality value (Q_in) or more among SSBs (related to a contention based PRACH resource)

If one SSB is greater than a threshold, a corresponding beam RS is selected.

If a plurality of SSB is greater than a threshold, given one of corresponding beam RSs is selected.

If a beam greater than a threshold is not present, Step 3 is performed.

Step 3) A UE selects a given SSB among SSBs (connected to a contention based PRACH resource)

The UE transmits, to a base station, a PRACH resource & preamble that has been connection configured directly or indirectly to the beam RS (CSI-RS or SSB) selected in the above process.

In this case, the direct connection configuration is used in the case of the following 1) or 2).

1) If a contention-free PRACH resource & preamble is configured for a specific RS with respect to a candidate beam RS set separately configured for BFR use, 2) If a (contention based) PRACH resource & preamble mapped to SSBs generally configured for other use, such as random access, in a one-to-one manner In this case, the indirect connection configuration is used in the following cases.

If a contention-free PRACH resource & preamble is not configured for a specific CSI-RS within a candidate beam RS set separately configured for BFR use.

In this case, a UE selects a (contention-free) PRACH resource & preamble connected to SSB designed to be received through the same reception beam as a corresponding CSI-RS (i.e., quasi-co-located (QCLed) with respect to spatial Rx parameter).

Monitoring of gNB's Response to the BFRQ

A UE monitors the replay of a base station (gNB) for corresponding PRACH transmission.

In this case, a response to a contention-free PRACH resource & preamble is transmitted in a PDCCH masked with a C-RNTI, and is separately received in a RRC-configured search space for BFR.

The search space is configured in a specific CORESET (for BFR).

A CORESET (e.g., CORESET 0 or CORESET 1) and search space configured for a common contention PRACH based random access process is used for a response to a contention PRACH without any change.

If a reply is not present for a given time, the UE repeats anew beam identification & selection process and a BFRQ & monitoring gNB's response process.

The process may be performed until PRACH transmission reaches a preset maximum number N_max or a configured timer (BFR timer) expires.

When the timer expires, the UE stops contention free PRACH transmission, but may perform contention based PRACH transmission based on the selection of an SSB until N_max is reached.

FIG. 13 is a diagram for describing a beam failure recovery-related operation to which a method proposed in the present disclosure may be applied. Specifically, FIG. 13 illustrates a beam failure recovery operation in a primary cell (PCell).

Scheduling Request

A scheduling request (SR) is used to request an UL-SCH resource for new transmission.

0, 1 or one or more SR configurations may be configured in the MAC entity. The SR configuration is configured as a series of PUCCH resources for an SR in different BWPs and cells. In the case of a logical channel, a maximum of one PUCCH resource is configured for an SR per BWP.

Each SR configuration corresponds to one or more logical channels. Each logical channel may be mapped to 0 or one SR configuration configured by RRC. An SR configuration of a logical channel that has triggered a BSR (when such a configuration is present) is considered as a corresponding SR configuration for a triggered SR.

RRC configures the following parameters for a receiving scheduling request procedure.

SR-ProhibitTimer (per SR configuration)
sr-TransMax (per SR configuration).

The following UE variables are used for the scheduling request procedure.

SR_COUNTER (per SR configuration).

If an SR is triggered and other pending SRs corresponding to the same SR configuration are not present, the MAC entity needs to configure SR_COUNTER of a corresponding SR configuration to 0.

When an SR is triggered, it is considered that the SR is pending until it is cancelled. All pending SRs triggered before a MAC PDU assembly are cancelled, and sr-ProhibitTimer needs to be stopped until the MAC PDU is transmitted. The PDU includes a Long or Short BSR MAC CE including a buffer status up to the last event triggered before the MAC PDU assembly. When all pending data available for transmission in which UL grant can be transmitted can be accommodated, all the pending SRs are cancelled, and each sr-ProhibitTimer needs to be stopped.

It is considered that only PUCCH resources of a BWP activated in a time of SR transmission occasion are valid.

One MAC entity in which one or more SRs are pending needs to perform the following on each pending SR:

1> when a valid PUCCH resource configured for a pending SR is not present in the MAC entity:
2> an SpCell starts a random access procedure and cancels a pending SR.
1> If not, in the case of an SR configuration corresponding to a pending SR:
2> An MAC entity has an SR transmission occasion on valid PUCCH resource for a configured SR;
2> in a time of SR transmission occasion, sr-ProhibitTimer is not executed;
2> a PUCCH resource for an SR transmission occasion does not overlap a measurement gap;
2> When a PUCCH resource for an SR transmission occasion does not overlap an UL-SCH resource:
3> when SR_COUNTER<sr-TransMax:
4> SR_COUNTER is increased by 1.
4> a physical layer indicates that an SR is signaled on one valid PUCCH resource for an SR;
4> sr-ProhibitTimer is started.
3> In other cases:
4> the release of a PUCCH for all serving cells is notified through RRC;
4> the release of an SRS for all serving cells is notified through RRC;
4> configured downlink assignment and an uplink grant are released.
4> all PUSCH resources for semistatic CSI report are cleared.
4> an SpCell starts a random access procedure and cancels all pending SRs.

Reference 1: when an MAC entity has more than one overlapping valid PUCCH resources for an SR transmission occasion, the selection of a valid PUCCH resource for an SR for signaling the SR depends on a UE implementation.

Reference 2: when two or more individual SRs triggers a command instructing that an SR should be signals in the same valid PUCCH resource from a MAC entity to a PHY layer, SR_COUNTER for a relevant SR configuration is increased once.

The MAC entity may stop a random access procedure in progress (initiated by the MAC entity before a MAC PDU assembly) due to a pending SR in which a valid PUCCH resource is not configuration. Such a random access procedure may be stopped until a MAC PDU is transmitted by using an UL grant other than an UL grant provided by a random access response. The PDU includes a buffer status until the last event at which a BSR is triggered before the MAC PDU assembly or when an UL grant(s) can accommodate all pending data available for transmission.

PUCCH Formats

PUCCH formats may be classified depending on symbol duration, a payload size, and multiplexing. Table 10 indicates corresponding PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

Short-Duration PUCCH

A short-duration PUCCH may be divided into Formats 0 and 2. A short PUCCH having 2 symbols may be configured as one symbol short PUCCH structure is repeated.

The PUCCH Format 0 may support UCI having a maximum of 2 bits along with multiplexing. The Format 0 may be used when Low latency support, UCI having a small size, or a low PAPR is necessary. The Format 0 has a structure based on sequence (cyclic shift, CS) selection without a DMRS, and may generate 1 PRB or 1 to 2 symbols. Furthermore, the Format 0 may support a maximum of 3 UEs (in the case of 2 bits) or 6 UEs (in the case of 1 bit) per PRB.

The PUCCH Format 2 may support UCI having two bits or more without multiplexing. The PUCCH Format 2 may be used for Low latency support, UCI having a middle or large size. The PUCCH Format 2 may occupy 1 to 16 PRBs or 1 to 2 symbols. Furthermore, the PUCCH Format 2 may support one UE per PRB without multiplexing.

Long-Duration PUCCH

A PUCCH Format 1 may support UCI having a maximum of 2 bits along with multiplexing. The PUCCH Format 1 may be applied to coverage support, UCI having a small size, and many multiplexing. The PUCCH Format 1 has an LTE PF1-like structure (a structure in which an OCC and DMRS/UCI symbol of a time domain are intersected). The PUCCH Format 1 may occupy 1 PRB, 4 to 14 symbols, and may support a maximum of 84 UEs (12CSs×7 OCCs) per PRB.

A PUCCH Format 3 may support UCI having two bits or more without multiplexing. The PUCCH Format 3 may be applied to coverage support, UCI having a large size. The PUCCH Format 3 may occupy 1 to 16 PRBs, 4 to 14 symbols. The PUCCH Format 3 may support one UE per PRB without multiplexing.

A PUCCH Format 4 may support UCI having two bits or more along with multiplexing. The PUCCH Format 4 may be used for coverage support, UCI having a middle size. The PUCCH Format 4 has an LTE PF5-like structure (TDM of DMRS and DFTed UCI with F-domain OCC). The PUCCH Format 4 may occupy 1 PRB, 4 to 14 symbols, and may support a maximum of 2 UEs (when SF=2) or a maximum of 4 UEs (when SF=4) per PRB.

In Relation to UCI Multiplexing

When an overlap between a PUCCH(s)/PUSCH(s) occurs, multiplexing (i.e., UCI multiplexing) for UCI may be performed. The UCI multiplexing may be denoted as a PUCCH merging method. The UCI multiplexing may be configured as a procedure of Step 2.

In Step 1, a set of (in the time) not overlapped PUCCH resource(s) for UCI multiplexing may be determined (regardless of whether a PUSCH(s) is present) by merging a set of overlapping PUCCH resources.

Specifically, in Step 1, while PUCCH resource overlaps in a slot, a PUCCH resource (resource A) overlapping another PUCCH resource having the fastest start (and a maximum duration) may be determined. A PUCCH resource set (set X) overlapping the resource A may be determined. One PUCCH resource for multiplexing UCI of the resource A and the PUCCH resource of the set X may be determined. The set X (including the resource A) may be replaced with the determined PUCCH resource.

In Step 2, when a PUCCH resource(s) overlaps a PUSCH (s) as a result in Step 1, pieces of UCI are multiplexed on the overlapped PUSCH. If not, pieces of UCI may be multiplexed on the determined PUCCH resource.

UCI Multiplexing on PUCCH

UE Procedure for reporting HARQ-ACK and an SR

ACKNACK PUCCH format 0+SR PUCCH format 0/1: in the case of a positive SR, HARQ-ACK may be transmitted in AN PRO along with an additional CS offset. In the case of a negative SR, HARQ-ACK may be transmitted in an ACKNACK PUCCH format 0 without an additional CS offset.

ACKNACK PUCCH format 1+SR PUCCH format 0: (an SR is dropped) only HARQ-ACK may be transmitted in the ACKNACK PUCCH format 1.

ACKNACK PUCCH format 1+SR PUCCH format 1: in the case of a positive SR, HARQ-ACK may be transmitted through a (corresponding) SR PUCCH format 1 resource. In the case of a negative SR, HARQ-ACK may be transmitted through an ACKNACK PUCCH format 1 resource.

ACKNACK PUCCH format 2/3/4+SR PUCCH format 0/1: In the case of configured K SR PUCCHs, UCI in which ceil (log 2 (K+1)) bits indicating (all) negative or positive SR (ID) are added and combined with HARQ-ACK bits may be transmitted in the ACKNACK PUCCH format 2/3/4 resource.

Table 11 illustrates an example of a pre-configured rule/method related to multiplexing (i.e., PUCCH merging) between an ACKNACK PUCCH format and an SR PUCCH format (e.g., 3GPP TS 38.213. section 9.2.5 Reference).

TABLE 11

If a UE would transmit a PUCCH with $O_{ACK}$ HARQ-ACK information bits in a resource using PUCCH format 2 or PUCCH format 3 or PUCCH format 4 in a slot, as described in Subclause 9.2.3, $\lceil \log_2(K + 1) \rceil$ bits representing a negative or positive SR, in ascending order of the values of schedulingRequestResourceId, are appended to the HARQ-ACK information bits and the UE transmits the combined $O_{UCI} = O_{ACK} + \lceil \log_2(K + 1) \rceil$ UCI bits in a PUCCH using a resource with PUCCH format 2 or PUCCH format 3 or PUCCH format 4 that the UE determines as described in Subclauses 9.2.1 and 9.2.3. An all-zero value for the $\lceil \log_2(K + 1) \rceil$ bits represents a negative SR value across all K SRs.

UE Procedure for CSI and an SR Report

CSI PUCCH format 2/3/4+SR PUCCH format 0/1: in the case of a configured K SR PUCCH, UCI in which ceil (log 2 (K+1)) bits indicating (all) negative or positive SR (ID) are added and combined with CSI feedback bits may be transmitted in the CSI PUCCH format 2/3/4 resource.

Table 12 illustrates an example of a pre-configured rule/method related to multiplexing between a CSI PUCCH format and an SR PUCCH format (i.e., PUCCH merging) (e.g., 3GPP TS 38.213. section 9.2.5 Reference).

TABLE 12

If a UE would transmit a PUCCH with $O_{CSI}$ CSI report bits in a resource using PUCCH format 2 or PUCCH format 3 or PUCCH format 4 in a slot, $\lceil \log_2(K + 1) \rceil$ bits representing corresponding negative or positive SR, in ascending order of the values of schedulingRequestResourceId, are prepended to the CSI information bits as described in Subclause 9.2.5.2 and the UE transmits a PUCCH with the combined $O_{UCI} = \lceil \log_2(K + 1) \rceil + O_{CSI}$ UCI bits in a resource using the PUCCH format 2 or PUCCH format 3 or PUCCH format 4 for CSI reporting. An all-zero value for the $\lceil \log_2(K + 1) \rceil$ bits represents a negative SR value across all K SRs.

UE Procedure for Reporting HARQ-ACK/SR and CSI when a PUCCH Resource Indicator (PRI) is Indicated HARQ-ACK/SR and CSI may be transmitted through a PUCCH resource. One PUCCH resource set may be selected from several sets based on a total of UCI payload size $N_{UCI} = (O_{ACK} + O_{SR} + O_{CSI} + O_{CRC})$. A PUCCH resource within the selected set may be indicated by a PRI signaled in DL scheduling DCI. Furthermore, the number of PRBs (actually used) in a PUCCH resource may be determined based on a total UCI size NUCI and a maximum of coding rate R configured based on a PUCCH format. A minimum number of PRBs which may transmit the total UCI size NUCI along the coding rate R may be selected.

UE Procedure for Reporting HARQ-ACK/SR and CSI if PRI is not Indicated

HARQ-ACK/SR and CSI may be transmitted through a CSI PUCCH resource. A PUCCH resource may be selected from multiple CSI PUCCH resources based on a total UCI payload size NUCI and a maximum coding rate R. A resource capable of delivering a minimum UCI capacity (e.g., {# of Res}×R) and the total UCI size NUCI may be selected. The number of PRBs (actually used) in a PUCCH resource may be determined based on the total UCI size NUCI and the maximum coding rate R.

UCI Multiplexing on a PUCCH According to Coupling Between an ACKNACK PUCCH Format and a CSI PUCCH Format Table 13 illustrates an example of UCI multiplexing on a PUCCH according to coupling between an ACKNACK PUCCH format and a CSI PUCCH format. In a PUCCH, in the case of a Part2 CSI report, a PUCCH resource and multiple PRBs for the corresponding PUCCH resource may be determined based on a UCI payload size assuming that a CSI report is rank 1.

formats 0 and 2 may be included in the short PUCCH, and the PUCCH formats 1, 3 and 4 may be included in the long PUCCH.

A UE transmits one or two PUCCHs through a serving cell in different symbols within one slot. If two PUCCHs are transmitted in one slot, at least one of the two PUCCHs has a structure having a short PUCCH. That is, in one slot, (1) the transmission of a short PUCCH and a short PUCCH is possible and (2) the transmission of a long PUCCH and a short PUCCH is possible, but (3) the transmission of a long PUCCH and a long PUCCH is impossible.

The aforementioned contents (the 3GPP system, the frame structure, and the NR system) may be combined with methods to be described later, which are proposed in the present disclosure, and may be applied or may be supplemented in order to clarify a technical characteristic of the methods proposed in the present disclosure. The methods described hereinafter are classified merely for convenience of description, and some elements of any one method may be substituted with some elements of another method or may be mutually combined and applied.

In the present disclosure, a background of a BFRQ for an SCell and a method of effectively processing a beam failure occurring in a plurality of SCells are described.

In relation to the application of the aforementioned PRACH-based BFR procedure, the following contents may be considered. In the case of a PRACH-based BFR procedure to which a carrier aggregation (CA) is applied, an SCell

TABLE 13

| | PUCCH-Format2-simultaneous-HARQ-ACK-CSI = True/ Determined resource with ACKNACK/SR + CSI is Format 2 | PUCCH-Format3/4-simultaneous-HARQ-ACK-CSI = True/ Determined resource with ACKNACK/SR + CSI is Format 3/4 |
|---|---|---|
| CSI configured with Format 2 | Jointly encode ACKNACK and CSI report | Jointly encode ACKNACK and CSI report |
| CSI configured with Format 3/4 | Jointly encode ACKNACK and CSI Part 1. Drop CSI Part 2. | Jointly encode ACKNACK and CSI Part 1 at the configured max code rate. Separately encode CSI Part 2 using the remaining resources (if any) in the PUCCH |

Physical Uplink Control Channel (PUCCH)

A PUCCH supports multiple formats. The PUCCH formats may be classified based on symbol duration, a payload size and multiplexing. Table 14 is a table illustrating an example of the PUCCH formats.

TABLE 14

| Format | PUCCH length in OFDM symbols | Number of bits | Usage | Others |
|---|---|---|---|---|
| 0 | 1-2 | ≤2 | 1 | sequence selection |
| 1 | 4-14 | ≤2 | 2 | sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats in Table 14 may be basically divided into (1) a short PUCCH and (2) a long PUCCH. The PUCCH may not have an UL carrier. Although an SCell has an UL carrier, it has technical limits in that a contention based PRACH cannot be configured. Accordingly, a PRACH-based BFR procedure to which a carrier aggregation (CA) is applied is limitedly applied to only a PCell or a PSCell.

Due to limits in the application of the aforementioned PRACH-based BFR procedure, the following problems occur. If a PCell is operated in a low frequency band (e.g., 6 GHz or less) and a high frequency band (e.g., 30 GHz) is to be operated as an SCell, there is a problem in that a BFR is not supported in the high frequency band in which BFR support is more importantly affected.

For the above reason, in Rel-16 NR MIMO work item, standardization for a BFR report for a secondary cell (SCell) is in progress. Accordingly, the following contents may be considered.

UL transmission is impossible in a corresponding SCell with respect to at least DL only SCell. Accordingly, a (dedicated) PUCCH resource(s) used when a base station is notified that a beam failure has occurred in a corresponding SCell may be configured in a special cell (SpCell). A beam failure recovery request (BFRQ) for the SCell may be performed based on the configured PUCCH resources.

Hereinafter, a PUCCH configured for the beam failure recovery of an SCell is referred to as a FR-PUCCH for convenience of description. The term is used to distinguish between the term and another PUCCH in helping understanding, and is not intended to limit the technical scope through the corresponding term.

A role of a BFR-PRACH is to transmit both 'the occurrence of a beam failure+new beam RS (set) information' to a base station.

In contrast, a role of a BFR-PUCCH is to notify a base station of only 'the occurrence of a beam failure for an SCell(s)'. Detailed information related to an occurred beam failure may be transmitted as a subsequent report.

For example, a UE may transmit, to a base station, a MAC CE (or UCI) including information for at least one of the following i) to iii) as the subsequent report.

i) An SCell(s) in which a beam failure has occurred example: CC index(s)

ii) whether a new beam for an SCell(s) in which a beam failure has occurred is present iii) a corresponding beam RS ID(+quality) when a new beam is present In the case of the iii), information for quality (RSRP or SINR) of a new beam(s) according to a beam RS ID(s) may be included.

A subsequent beam report does not need to be always triggered. Specifically, after receiving a BFR-PUCCH, a base station may deactivate an SCell(s) in which a BFR configuration has been configured for a corresponding UE.

The above operation is for increasing UL resource utilization. Specifically, there is a case where several tens of SCells are connected to one PCell/PSCell, and there may be many UEs sharing one PCell/PSCell UL from a base station viewpoint. When even such a case is considered, it is preferred that the amount of UL resources reserved in each UE as SCell BFRQ use is minimized in a PCell/PSCell. Accordingly, after receiving a BFR-PUCCH, the base station may deactivate an SCell(s) in which a beam failure has occurred.

A scheduling request (SR) PUCCH method may be reused in that the amount of information to be contained in a BFR-PUCCH is very small (e.g., 1 bit) and a corresponding BFR-PUCCH is transmitted only when an event of a UE occurs.

For example, when a BFR-PUCCH resource(s) is configured in PCell/PScell UL through a RRC message, the corresponding PUCCH resource(s) may be configured through only the PUCCH format 0 or the PUCCH format 1. The existing SR-related MAC sublayer operations, such as SR retransmission or an SR prohibit timer, may be reused. Corresponding BFRQ information may be transmitted through another PUCCH resource or PUSCH resource according to a collision handling rule and/or UCI multiplexing rule with a BFR-PUCCH and another PUCCH or PUSCH. In this case, the corresponding BFR-PUCCH resource(s) does not causes resource waste because the resource(s) is not a PUCCH resource always reserved from a base station viewpoint.

Even in a MAC sublayer-related operation viewpoint, the following embodiments may be considered.

For example, values in which an SR retransmission-related prohibit timer value, a maximum retransmission value, etc. will be applied to a BFRQ operation and values to be applied to a common scheduling request may be defined to be identically applied. For another example, in order for a BFRQ to be handled a urgent/important information compared to an SR, the values to be applied may be separately configured/defined with respect to the SR and BFRQ.

In particular, a base station that has received a BFRQ may deactivate a corresponding Scell(s) without performing beam recovery on an SCell(s) of a corresponding UE. In such a case, it will be unnecessary for the base station to retransmit the BFRQ several times because the base station will not allocate an UL-SCH to the UE. By considering this, a maximum retransmission value for the BFRQ may be smaller configured/defined. For example, the BFRQ may not be retransmitted (a maximum retransmission value=1).

If a BFR-PUCCH resource and an SR-PUCCH resource (for a specific BWP/serving cell) are (temporally) overlapped and configured and an event that an SR-related pre-defined event and BFRQ (for a corresponding BWP/serving cell) needs to be transmitted occurs, there is a problem in that ambiguity occurs regarding how a UE transmits which one of PUCCH resources configured for an SR use and PUCCH resources configured for a BFRQ use. The present disclosure proposes the following methods (e.g., Method 1 (Method 1.1/1.2)/Method 2/Method 3/Method 4) of Proposal 1 as a solution thereto.

[Proposal 1]

If a BFR-PUCCH resource and an SR-PUCCH resource are overlapped and a scheduling request event (SR event) and a beam failure event (BF event) occur together, a UE/base station may operate according to Method 1 (Method 1.1/1.2)/Method 2/Method 3/Method 4 to be described later.

[Method 1]

A UE may select a BFR-PUCCH resource and first transmit a BFRQ.

[Method 1.1]

A UE may stop (pend) an SR procedure, and may transmit an SR-PUCCH through a valid SR-PUCCH resource after BFRQ transmission.

[Method 1.2]

A UE may cancel a pending SR by considering a situation for a no valid PUCCH resource for an SR with respect to the SR, and may initiate a random access procedure.

Method 1 is a method giving priority to recovery of a beam.

Specifically, when an SR event and a BFR event as a case where an SR-PUCCH resource and a BFR-PUCCH resource are overlapped simultaneously occur, in Method 1, a UE selects and reports the BFR-PUCCH resource because the recovery of a beam is first. Effects according to Method 1 are as follows. A base station can more preferentially recognize a BFR situation than an SR-related situation with respect to a corresponding UE. A base station can preferentially perform a determination, such as that a beam recovery procedure is performed or a corresponding Scell(s) is deactivated.

If Method 1.1 is applied, when SR transmission/retransmission is controlled, an SR procedure may be changed so that the method is limitedly applied to a case where a collision against a BFRQ resource is not present. Table 15 is an embodiment of a MAC layer operation viewpoint related to the application of Method 1.1.

TABLE 15

1> If a valid PUCCH resource configured for a pending SR is not present in a MAC entity:
2> An SpCell starts a random access procedure (a random access-related procedure Reference) and cancels the pending SR.
1> If not, with respect to an SR configuration corresponding to the pending SR:
2> When an MAC entity has an SR transmission occasion on a valid PUCCH resource for a configured SR;
2> if sr-ProhibitTimer is not executed in a time of the SR transmission occasion;
2> a PUCCH resource for the SR transmission occasion does not overlap a measurement gap;
2> a PUCCH resource for the SR transmission occasion does not overlap an UL-SCH resource;
2> a PUCCH resource for the SR transmission occasion does not overlap a PUCCH resource for a BFRQ:
3> when SR_COUNTER < sr-TransMax:
4> SR_COUNTER is increased by 1;
4> a physical layer indicates that an SR is signaled on one valid PUCCH resource for the SR;
4> sr-ProhibitTimer is started.
3> In other cases:
4> Notification is provided so that a PUCCH for all serving cells is released through RRC;
4> Notification is provided so that an SRS for all serving cells is released through RRC;
4> Configured downlink assignment and an uplink grant are cleared.
4> All PUSCH resources for a semi-permanent CSI report are cleared.
4> An SpCell starts a random access procedure and cancels pending all SRs.
Reference 1: when a MAC entity has more than one overlapping valid PUCCH resource for an SR transmission occasion, the selection of a valid PUCCH resource for an SR for signaling the SR depends on a UE implementation.
Reference 2: when two or more individual SRs trigger a command to signal the SRs in the same valid PUCCH resource from the MAC entity to the PHY layer, SR_COUNTER for a relevant SR configuration is increased only once Furthermore, Method 1.2 is a method of operating an RS as a fall-back procedure (an underlined portion in Table 16). If the method is applied, the contents of Reference 3 in Table 16 may be applied to an operation of a UE/base station.

TABLE 16

1> If a valid PUCCH resource configured for a pending SR is not present in a MAC entity:
2> An SpCell starts a random access procedure (a random access-related procedure Reference) and cancels the pending SR.
1> If not, with respect to an SR configuration corresponding to the pending SR:
2> When an MAC entity has an SR transmission occasion on a valid PUCCH resource for a configured SR;
2> if sr-Prohi bitTimer is not executed in a time of the SR transmission occasion;
2> a PUCCH resource for the SR transmission occasion does not overlap a measurement gap;
2> a PUCCH resource for the SR transmission occasion does not overlap an UL-SCH resource;
2> a PUCCH resource for the SR transmission occasion does not overlap a PUCCH resource for a BFRQ:
3> when SR_COUNTER < sr-TransMax:
4> SR_COUNTER is increased by 1;
4> a physical layer indicates that an SR is signaled on one valid PUCCH resource for the SR;
4> sr-ProhibitTimer is started.
3> In other cases:
4> Notification is provided so that a PUCCH for all serving cells is released through RRC;
4> Notification is provided so that an SRS for all serving cells is released through RRC;
4> Configured downlink assignment and an uplink grant are cleared.
4> All PUSCH resources for a semi-permanent CSI report are cleared.
4> An SpCell starts a random access procedure and cancels pending all SRs.
Reference 1: when a MAC entity has more than one overlapping valid PUCCH resource for an SR transmission occasion, the selection of a valid PUCCH resource for an SR for signaling the SR depends on a UE implementation.
Reference 2: when two or more individual SRs trigger a command to signal the SRs in the same valid PUCCH resource from the MAC entity to the PHY layer, SR_COUNTER for a relevant SR configuration is increased only once.

TABLE 16-continued

Reference 3: when a PUCCH resource for an SR transmission occasion overlaps a PUCCH resource for the BFRQ tranmission occasion, a PUCCH resource for the SR transmission occasion is considered to be invalid (or considered to be pending in the case of Method 1.1 and Method 1.3)

[Method 2]

A UE may select a PUCCH resource separately configured/regulated to be used upon simultaneous transmission of a BFRQ event and an SR event, and may transmit an SR and BFRQ.

A base station may separately configure a PUCCH resource for BFRQ+SR in the UE. Specifically, the base station may configure, in the UE, an SR-dedicated PUCCH resource(s), a BFRQ-dedicated PUCCH resource(s), and a PUCCH resource(s) for an SR+BFRQ use. The UE may select a separately configured PUCCH resource and transmit the SR and BFRQ (i.e., when an SR event and a BFRQ event simultaneously occur) in the case of the SR+BFRQ.

[Method 3]

When a BFRQ/SR event occurs, a UE may transmit an SR/BFRQ in a specific PUCCH resource. Depending on whether an SR and BFRQ simultaneously occur, the UE may transmit a separate sequence/message.

The separate sequence/message may have its state divided into the following states depending on a format of the PUCCH resource and may be represented.

1) A cyclic shift value of a sequence in the case of the PUCCH format 0
2) A sequence in the case of the PUCCH format 1
3) UCI bits (on which channel coding will be performed) in the case of the PUCCH format 2/3/4

Specifically, it may be defined that the following states are divided and represented based on the 1) to 3).

① positive SR+positive BFRQ or positive SR+negative BFRQ (for SR-PUCCH)

② positive BFRQ+positive SR or positive BFRQ+negative SR (for BFR-PUCCH)

③ positive BFRQ+positive SR, positive BFRQ+negative SR, negative BFRQ+positive SR, or negative BFRQ+negative SR (for SR-PUCCH, BFR-PUCCH, or a PUCCH resource used for both cases of SR and BFR)

The ① may be applied to an SR-PUCCH, the ② may be applied to a BFR-PUCCH, and the ③ may be applied to a PUCCH resource used when an SR-PUCCH/BFR-PUCCH/SR and a BFR simultaneously occur.

In Method 3, a UE transmits a BFR-PUCCH/SR-PUCCH through one of a BFR-PUCCH resource and an SR-PUCCH resource having a collision. Specifically, in Method 3, in the case of an SR+BFRQ situation, it is defined/configured that a UE transmits a BFR-PUCCH/SR-PUCCH based on separately defined/configured UCI bits, a sequence, or a sequence to which a cyclic shift (CS) is applied depending on a PUCCH format.

For example, if a resource having the PUCCH format 0 is used for SR purposes, HARQ-ACK/NACK information may be additionally transmitted based on a CS value. The CS value may be differently defined/configured depending on whether a BFRQ occurs with respect to a PUCCH resource for an SR purpose by using such a principle. In contrast, a PUCCH resource for a BFR purpose uses a resource having the PUCCH format 0, a UE may transmit a corresponding PUCCH only in a BFR situation. In this case, information indicating whether an SR is positive (i.e., positive SR or negative SR) may also be transmitted depending on the CS value. In the case of the PUCCH format 1, the method may be applied by changing a sequence not the CS value. Based on such a principle, an SR and BFRQ-combined use PUCCH resource may be configured. That is, one PUCCH resource may be configured to be used for an SR use and a BFRQ use. For which use a corresponding PUCCH resource will be used may be reported depending on UCI transmitted through a corresponding PUCCH resource. Specifically, an SR use (SR event occurs), a BFRQ use (BFRQ event occurs) and/or an SR+BFRQ use (SR event and BFRQ event simultaneously occur) may be reported through the UCI.

The BFR/SR-combined use PUCCH resource may be limitedly applied to a case where 1) a plurality of SCells sharing one PUCCH resource from a BFRQ viewpoint and 2) a plurality of Scells sharing one PUCCH resource from an SR viewpoint are the same.

[Method 4]

A base station may configure an SR-PUCCH resource and a BFR-PUCCH resource to be always disposed at different symbols. Accordingly, a case where the SR-PUCCH resource and the BFR-PUCCH resource overlap can be prevented. A UE may not expect a configuration in which an SR-PUCCH resource and a BFR-PUCCH resource overlap.

Method 4 guarantees that an overlap between an SR-PUCCH resource and a BFR-PUCCH resource does not occur in resource allocation of a base station. In this case, there is an advantage in that a UE does not need to perform special handling on a collision situation between an SR-PUCCH and a BFR-PUCCH, but a degree of freedom of a PUCCH resource configuration of the base station may be limited. In particular, when a case where an SR PUCCH resource is configured every slot is considered, limitation inevitably occurs in symbol duration of an SR PUCCH resource.

In an NR system, when a (temporal) overlap between PUCCH resources and PUSCH resources occurs, a procedure of binding and transmitting UCI information to be transmitted has been defined (e.g., UCI multiplexing procedure). The corresponding process is summarized as follows.

First, if overlap PUCCH resources are present, a UE merges pieces of UCI information to be transmitted through the corresponding resources into one PUCCH resource in which the pieces of UCI information can be transmitted together according to a predetermined rule. The merged PUCCH resource may be one of the overlapped PUCCH resources or may be another PUCCH resource. The UE fully solves the overlap between the PUCCH resources by repeating the process, and may operate as follows.

1) If a PUSCH resource overlapping a finally selected PUCCH resource is not present, the UE transmits the UCI merged with a corresponding PUCCH resource.

2) If a PUSCH resource overlapping the selected PUCCH resource is present, the UE transmits UCI merged with a PUSCH resource instead of the corresponding PUCCH resource.

In Method 1 (Method 1.1/1.2)/Method 2/Method 3/Method 4 of Proposal 1, an SR PUCCH resource may be a PUCCH resource configured for an SR use by a base station or may be a PUCCH resource in which an SR message is transmitted.

If the SR PUCCH resource is interpreted as the former, the SR PUCCH resource may correspond to a resource (hereinafter referred to as an "SR-dedicated-PUCCH") separately configured for an SR transmission use by a base station according to the PUCCH format 0 or format 1.

In contrast, the SR PUCCH resource interpreted as the latter may include a resource according to the following cases in addition to the resource according to the former. Specifically, when an overlap occurs between an SR-dedicated-PUCCH and a PUCCH resource in which another UCI will be transmitted and a UE transmits an SR message through another PUCCH, the corresponding PUCCH resource may correspond to an SR-PUCCH resource (hereinafter referred to as an "SR-non-dedicated-PUCCH"). The SR-non-dedicated-PUCCH may correspond to the PUCCH format 2/3/4 in addition to the PUCCH format 0/1.

Likewise, a BFR-PUCCH may also be a PUCCH configured for a BFRQ use by abase station or may be a PUCCH for transmitting a BFRQ message. If the BFR-PUCCH is interpreted as the latter, the BFR-PUCCH may not be limited to the PUCCH format 0/1.

If a case where another UCI is multiplexed with an SR-PUCCH and/or a BFR-PUCCH and in particular, the amount of information of the multiplexed UCI is a given degree or more is considered, application thereof may be limited in the case of Method 2 and Method 3. Specifically, the application of Method 2 and Method 3 may be limited due to the limit of a UCI payload size which may be transmitted by a UE and due to an overhead problem according to a reserved PUCCH resource.

In the case of Method 4, when the aforementioned PUCCH resource merging procedure is considered, it may be difficult to always guarantee collision avoidance through Method 4 in addition to a collision avoidance purpose between dedicated PUCCH resources for an SR use or BFR use. Furthermore, Method 1 may also have limitation in that all types of UCI to be transmitted through an SR-PUCCH are dropped if a BFR-PUCCH is a resource in which UCI much smaller than that of an SR-PUCCH is transmitted. For example, the BFR-PUCCH may be a PUCCH resource for the transmission of information of 1 bit, but the SR-PUCCH may be a PUCCH resource in which even several tens of bits can be transmitted because it is a resource in which SR+CSI are transmitted. In such a case, even CSI may be dropped in addition to the SR.

Accordingly, it may be preferred that Method 1 (Method 1.1/1.2)/Method 2/Method 3/Method 4 is applied to only a collision (or if overlapped resources have the PUCCH format 0/1) between an SR-dedicated-PUCCH and a BFR-dedicated-PUCCH.

Hereinafter, Proposal 2 proposes an effective method when an overlap between an SR-non-dedicated-PUCCH and a BFR-dedicated-PUCCH, an SR-dedicated-PUCCH and a BFR-non-dedicated-PUCCH, or an SR-non-dedicated-PUCCH and a BFR-non-dedicated-PUCCH occurs.

[Proposal 2]

A UE may transmit an SR/BFRQ based on the merging of UCI in the case of at least one of the following 1) or 2).

1) When an overlap between an SR-PUCCH and a BFR-PUCCH occurs, in particular, if at least one of the overlapped resources is not the PUCCH format 0/1.

2) In the case of a PUCCH resource multiplexed with another UCI in addition to an SR/BFRQ.

A UE may transmit a UCI set #0 to be transmitted through an SR-PUCCH and a UCI set #1 to be transmitted through a BFR-PUCCH by merging them. For example, the transmission may be performed in a selected specific one PUCCH resource based on a pre-defined PUCCH merging method (e.g., refer to the UCI multiplexing contents).

In this case, SR information belonging to the UCI set #0 and BFRQ information belonging to the UCI set #1 may be transmitted based on at least one of Method 1 to Method 3.

[Method 1]

A UE may transmit only one of the two (according to a predetermined priority),

[Method 2]

A UE may transmit both SR information and BFRQ information, but may transmit the SR information and the BFRQ information by joint encoding them into one information field.

[Method 3]

A UE may transmit SR information and BFRQ information by configuring them as each of information fields.

Proposal 2 is a method of transmitting pieces of UCI multiplexed with a BFRQ/SR without dropping the UCI.

For example, a case where a PUCCH resource #0 is a resource for transmitting SR(s)+UCI #0 and a PUCCH resource #1 is a resource for transmitting BFRQ+UCI #1 is assumed. In this case, if this method is applied to a case where an overlap between the two PUCCH resources occurs, a UE may transmit BFRQ+SR(s)+UCI #0+UCI #1 together through one of the two PUCCH resources and a third PUCCH resource according to the pre-defined PUCCH resource merging rule. In this case, when a UCI payload size is greater than a maximum payload which may be transmitted through the PUCCH resource, the corresponding UE may be configured to drop some according to UCI priority.

In applying Method 1, a BFRQ may be defined to have higher priority than an SR.

For example, a method of transmitting only one of independently defined BFRQ field and SR field may be considered.

For another example, a method of adding one state so that a specific state of reporting states for the existing SR represents a (positive) BFRQ may be applied (e.g., transmit SR or BFRQ information based on one SR field). For example, in the NR system, as described in [Table 11]/[Table 12] in relation to UCI multiplexing, the method may be applied to a case where K SRs overlap. In this case, an SR field configured as ceil(log 2(K+1)) bits may be configured by considering up to a state representing a BFRQ so that a case where (the existing) specific one SR information (e.g., a state indicating that any one of the K SRs is positive) or all SRs are negative can be selected and transmitted. The SR field may be configured as ceil(log 2(K+2)) bits. If the method is applied, a UE may report only one of a BFRQ or an SR through the corresponding field (e.g., a specific state among all state capable of being represented as a corresponding SR field (e.g., ceil(log 2(K+2)) bit field) may represent the BFRQ, and the remaining states may represent K overlapped SR-related information).

In addition, if Method 1 is applied, the corresponding field may be named as an SR field, a BFRQ field, or an SR/BFRQ field.

When a BFRQ and an SR occur, it may be additionally defined that a UE reports any one of the BFRQ or the SR according to priority between the BFRQ and the SR (e.g., reports the BFRQ over the SR). For example, if K is 4, the BFRQ or the SR may be reported through an SR field in which ceil(log 2(K+2))=3 bits. If the SR field having 3 bits is 000, this indicates a case where all SRs are negative. If the SR field is (001/010/011/100), it may represent that a specific SR is positive in order of schedulingRequestResourceId among 4 SRs configured for a UE, and the SR field may represent a BFRQ in the case of (101/110/111). In this case, a combination of bits representing each SR and/or BFRQ may be changed depending on a UE/base station implementation.

As an embodiment of Method 2, the following method may be considered. Specifically, SR and BFRQ states (SR+BFRQ states) obtained by further extending the existing SR state by N (e.g., N=1) bits may be configured. If a BFRQ is configured as 1 bit only with respect to all SCells, when this method is applied, an SR field may be configured as ceil(log 2(K+1))+1 bit. In this case, due to the added 1 bit, the existing SR state may be extended and represented as two states of an SR+positive BFRQ and an SR+negative BFRQ.

Method 3 is a method of configuring, attaching and transmitting a BFRQ and an SR as respective independent information fields.

If the existing UCI multiplexing method is applied, when UCI is transmitted in a PUSCH, a UE does not transmit an SR. The reason for this is that the SR is for PUSCH resource assignment and there is no problem if an SR process is omitted and a buffer status reporting (BSR) MAC-CE is transmitted in a corresponding PUSCH because a PUSCH resource is allocated/configured.

In such a viewpoint, a BFRQ also has similarity with an SR. For a BFR report, a MAC CE (hereinafter referred to as a "BFR MAC-CE") in which a failed CC index (ice) and/or a new beam ID(s) may be transmitted may be defined. Accordingly, a UE may operate as follows. If UCI is transmitted in a PUSCH due to an overlap between the PUSCH and a PUCCH, a UE may omit a BFRQ in UCI which will be transmitted in a PUSCH. A UE may notify a base station of the occurrence of a BFR by transmitting a BFR MAC-CE through a corresponding PUSCH.

[Proposal 3]

A UE may transmit only UCI other than a BFRQ in a PUSCH (by piggybacking the UCI) when a BFR-PUCCH to be transmitted overlaps an allocated PUSCH in a time axis.

Hereinafter, a BFR-related proposal(s) related to the aforementioned proposal method (e.g., Method 1/Method 1-1/Method 1-2/Method 2/Method 3/Method 4 of Proposal 1 and/or Method 1/Method 2/Method 3 of Proposal 2 and/or Proposal 3) is described.

Enhancement on Beam Failure Recovery

Beam failure recovery (BFR) may be performed as two steps based on agreement contents. Step 1 may be performed by a dedicated SR-like PUCCH resource, and Step 2 may be performed as a MAC CE (WA). According to the agreement contents, the following remaining issues need to be solved.

BFRQdedicated PUCCH resource design (BFRQ-PUCCH)
  BFD detailed contents for SCell(s)
  Detailed contents for a BF report of a UE In order to design a BFRQ-PUCCH, BFRQ-PUCCH-based beam failure recovery request (BFRQ) needs to reuse an SR-PUCCH-based SR procedure as much as possible. In an RAN1 viewpoint, only the PUCCH format 0 or format 1 may need to be configured with respect to the same BFRQ-PUCCH resource as an SR-PUCCH. In the case of one UE, one BFRQ-PUCCH resource will be sufficient per cell group. When a BFRQ-PUCCH overlaps another PUCCH/PUSCH in which HARQ-A/N or CSI is delivered, the existing collision handling rules, such as UCI multiplexing/dropping, may be applied by handling a BFRQ as an SR. When a BFRQ-PUCCH overlaps an SR-PUCCH, the SR-PUCCH needs to be dropped.

Proposal X1: in the case of BFRQ-PUCCH resources
    Only PUCCH format 0 or 1 is allowed.
  a maximum of one BFRQ-PUCCH resource may be configured per cell group.
  When a BFRQ-PUCCH overlaps another PUCCH/PUSCH, the existing collision handling rule is applied by handling a BFRQ as an SR except a case where an SR-PUCCH is overlapped.
  When a BFRQ-PUCCH and an SR-PUCCH overlap in a time domain, the SR-PUCCH is dropped.

From a RAN2 viewpoint, the existing SR procedure needs to be a criterion for a BFRQ procedure. One difference between an SR and BFRQ is that there is possibility that gNB may not allocate a PUSCH if gNB attempts to deactivate a failed SCell. When a BFRQ retransmission counter reaches a maximum value which may be set by RRC independently of a retransmission counter for an SR, a UE may understand that a base station's intention is to deactivate a failed SCell(s). That is, if a corresponding BFRQ is transmitted by a given number or more without a response to the BFRQ, a UE may consider that an SCell(s) in which a beam failure has occurred is deactivated by a base station.

Proposal X2: the existing SR procedure needs to be a criterion for a BFRQ procedure. In the case of the BFRQ procedure, in order to deactivate a failed SCell(s), the possibility that a PUSCH is not allocated by a base station needs to be considered.

In relation to beam failure detection (BFD) for an SCell(s), the possibility of simultaneous BFD of multiple SCells needs to be considered. This may frequently occur when an SCell is all FR2 and a base station/UE antenna are implemented based on multiple band antennas. First, in order to support various base station/UE antenna implementations and support various SCell combinations, a BFI count needs to be performed every serving cell. Under this assumption, when a beam-failure sequentially occurs in other SCells (e.g., a beam failure attributable to beam blockage), a UE may transmit a BFRQ-PUCCH several times within a very short period. In this case, if a BFI counter for the SCell is not 0, although a BFI counter for another SCell reaches a maximum value, it is more efficient for a UE to wait for the transmission of a BFRQ-PUCCH.

Proposal X3: In the case of SCell BFD, a BFI may be counted per serving cell. If several BFI counters are executed together, when all the counters reach a maximum value or 0, a BFRQ may be transmitted.

Whether a new beam for a failed SCell ID and a failed SCell is present needs to be reported in Step 2. Accordingly, the BF report in Step 2 needs to include 1) a bitmap of an SCell failure indicator (SFI) and 2) a bitmap of a new beam find indicator (NBFI) in order to report whether a new beam is discovered with respect to a failed SCell ID and each failed SCell. The last report parameter needs to be a sequence of new beam RS IDs. In this case, each RS ID is sequentially mapped to an SCell ID having a non-zero value with respect to both the SFI and the NBFI field.

Proposal X4: the BF report in Step 2 may be configured as the following information field.
    A bitmap of SCell failure indicators (SFI)
    A bitmap of new beam found indicators (NBFI)
    A sequence of beam RS ID(s) (only for SCells with non-zero SFI and non-zero NBFI)

From an implementation aspect, the aforementioned operations (e.g., the aforementioned proposal method (e.g., an operation related to beam failure recovery based on at least one of Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4) of a base station/UE according to an embodiments may be processed by an apparatus of FIGS. 17 to 21 (e.g., a processor 102, 202 in FIG. 18) to be described later.

Furthermore, the aforementioned operations (e.g., operations related to beam failure recovery based on at least one of Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4) of a base station/UE according to an embodiment may be stored in a memory (e.g., 104, 204 in FIG. 18) in the form of an instruction/program (e.g., an instruction or an executable code) for driving at least one processor (e.g., 102, 202 in FIG. 18).

FIG. 14 illustrates an example of signaling between a UE/base station to which a method proposed in the present disclosure may be applied. Specifically, FIG. 14 illustrates an example of signaling between a user equipment (UE)/base station (BS) based on the aforementioned proposal method (e.g., Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4).

In this case, the UE/BS is merely an example, and may be applied by being replaced with various apparatuses as described with reference to FIGS. 17 to 21. FIG. 14 is merely for convenience of description, and does not limit the scope of the present disclosure. Furthermore, some step(s) illustrated in FIG. 14 may be omitted depending on a situation and/or a configuration.

A UE may receive, from a BS, a BFR-related configuration (BFR related Config) (i.e., configuration information related to a BFR) and/or an SR-related configuration (related Config) (i.e., a configuration related to an SR) (S1410).

For example, the configuration information related to BFR may include configuration information related to an operation of Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4. The configuration information related to BFR may include a resource configuration (e.g., a configuration for a BFR-PUCCH resource) for a BFR, configuration information for a timer or a counter, etc. Furthermore, the configuration information related to an SR may include a resource configuration (e.g., a configuration for an SR-PUCCH resource) for an SR, configuration information for a timer or a counter, etc. The configuration information related to BFR and/or the configuration information related to an SR may be delivered through higher layer signaling (e.g., RRC signaling), etc.

Furthermore, for example, as in Method 1/2/3 of Proposal 2, the configuration information related to BFR (e.g., a state configuration of a BFR field) and/or the configuration information related to an SR (e.g., a state configuration of an SR field) may be configured based on UCI multiplexing, that is, a PUCCH merging method. In this case, when an overlap between an SR-PUCCH and a BFR-PUCCH occurs, in particular, if at least one of overlapped resources does not have the PUCCH format 0/1 and/or if a resource is a PUCCH resource multiplexed with another UCI other than an SR/BFRQ, the UCI multiplexing may be performed. In relation to the UCI multiplexing, the configuration information related to an SR may be configured as in the following examples. For example, as in Method 1 of Proposal 2, an SR (or SR/BFRQ) field may be configured to include bit information indicating all SR negative states/bit information indicating that a specific SR has a positive state/bit information related to a BFRQ. For example, as in Method 2 of Proposal 2, BFRQ-related bit information may be additionally configured in (the existing) SR field. For example, as in Method 3 of Proposal 2, the SR field may be configured independently of the BFRQ field.

For example, the operation of receiving, by the UE (100/200 in FIGS. 17 to 21), BFR related Config./SR related Config. From the BS (100/200 in FIGS. 17 to 21) in step S1410 may be implemented by the apparatus of FIGS. 17 to 21 to be described later. For example, referring to FIG. 18, the one or more processors 102 may control the one or more transceivers 106 and/or one or more memories 104 to receive the BFR related Config./SR related Config. The one or more transceivers 106 may receive the BFR related Config./SR related Config. from the BS.

The UE may perform a power control procedure for transmitting a PUCCH (e.g., a BFR-PUCCH, a BFR related PUCCH, an SR-PUCCH, an SR related PUCCH) along with the BS (S1420). For example, in the case of the BFR-PUCCH, a power control parameter/command may be configured/indicated separately from another PUCCH (e.g., an SR-PUCCH, an ACKNACK-PUCCH). For example, transmission power for a PUCCH may be determined by considering methods proposed in Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4.

For example, the operation of performing, by the UE (100/200 in FIGS. 17 to 21), the power control procedure in step S1420 may be implemented by the apparatus of FIGS. 17 to 21 to be described later. For example, referring to X1, the one or more processors 102 may control the one or more transceivers 106 and/or the one or more memories 104 to perform the power control procedure. The one or more transceivers 106 may transmit and receive radio channels/signals for performing the power control procedure.

As described above, the UE may transmit, to the BS, a PUCCH (e.g., a BFR-PUCCH, a BFR related PUCCH, an SR-PUCCH, an SR related PUCCH) with determined transmission power (S1430). For example, the UE may transmit, to the BS, the PUCCH (e.g., a BFR-PUCCH, a BFR related PUCCH, an SR-PUCCH, an SR related PUCCH) based on Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4.

For example, when an SR-PUCCH resource and a BFR-PUCCH resource overlap, the UE may preferentially transmit a BFRQ (i.e., a BFR-PUCCH) according to a given rule, may transmit a BFRQ and an SR through separate PUCCH resources, or may transmit a BFR/SR-PUCCH based on separately defined/configured UCI bits, a sequence, or a sequence to which a cyclic shift (CS) has been applied according to a PUCCH format. Alternatively, the UE may not expect a case where an SR-PUCCH resource and a BFR-PUCCH resource overlap itself.

For example, a case where an SR-PUCCH resource and a BFR-PUCCH resource overlap, in particular, a case where at least one of overlapped resources does not have the PUCCH format 0/1 and/or is a PUCCH resource multiplexed with another UCI other than an SR/BFRQ is assumed. In this case, a UE may transmit any one of an SR belonging to a first UCI set to be transmitted through an SR-PUCCH and a BFR belonging to a second UCI set to be transmitted through a BFR-PUCCH through a PUCCH (according to the first rank rule, etc.). For example, as in Method 1 of Proposal 2, an SR (or SR/BFRQ) field of a corresponding PUCCH may be configured to include bit information indicating all SR negative states/bit information indicating that a specific SR has a positive state/bit information related to a BFRQ. And/or a UE may transmit an SR belonging to a first UCI set to be transmitted through an SR-PUCCH and a BFR belonging to a second UCI set to be transmitted through a BFR-PUCCH through a PUCCH by joint encoding them into one field (e.g., an SR field/BFR field). For example, as in Method 2 of Proposal 2, BFRQ-related bit information may be additionally configured in (the existing) SR field. And/or a UE may transmit an SR belonging to a first UCI set to be transmitted through an SR-PUCCH and a BFR belonging to a second UCI set to be transmitted through a BFR-PUCCH through a PUCCH based on respective SR fields/BFR fields. For example, as in Method 3 of Proposal 2, the SR field may be configured independently of the BFRQ field. In a corresponding example(s), a PUCCH in which an SR/BFR is transmitted may be a specific PUCCH selected based on a pre-defined PUCCH merging method (UCI multiplexing Reference).

For example, as in Proposal 3, when a BFR-PUCCH overlaps a PUSCH (pre-) allocated to a UE, the UE may transmit only a PUSCH other than BFRQ information by piggybacking only UCI to the PUSCH. In this case, the UE may not transmit a BFR PUCCH (i.e., S1430 may not be performed).

For example, prior to PUCCH transmission, the operation in the MAC layer described in Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4 may be preferentially performed. As a detailed example, if a U preferentially transmits a BFRQ, before the BFRQ transmission, the aforementioned operation in the MAC layer described in Table 15/Table 16 may be preferentially performed.

For example, the operation of transmitting, by the UE (100/200 in FIGS. 17 to 21), a PUCCH to the BS (100/200 in FIGS. 17 to 21) in step S1430 may be implemented by the apparatus of FIGS. 17 to 21 to be described later. For example, referring to FIG. 18, the one or more processors 102 may control the one or more transceivers 106 and/or the one or more memories 104 to transmit the PUCCH. The one or more transceivers 106 may transmit the PUCCH to the BS.

The UE may receive an UL grant (e.g., UL DCI) for PUSCH (e.g., a BFR-related PUSCH) scheduling from the BS (S1440). For example, with reference to Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4, the PUSCH may be a PUSCH for delivering a MAC-CE (or UCI) including a report (e.g., SCell(s) information (e.g., CC index(es) on which a beam failure has occurred) and/or whether a new beam for a corresponding SCell(s) is present and/or a corresponding beam RS ID (and/or quality (e.g., RSRP/SINR) of a corresponding beam when a new beam is present) related to BFR. That is, the UE may receive, through a PDCCH (i.e., a PDCCH for an UL grant), scheduling information of a PUSCH for delivering a MAC-CE (or UCI) including a report related to the BFR.

For example, the operation of receiving, by the UE (100/200 in FIGS. 17 to 21), an UL grant for PUSCH scheduling from the BS (100/200 in FIGS. 17 to 21) in step S1440 may be implemented by the apparatus of FIGS. 17 to 21 to be described later. For example, referring to FIG. 18, the one or more processors 102 may control the one or more transceivers 106 and/or the one or more memories 104 to receive the UL grant for PUSCH scheduling. The one or more transceivers 106 may receive the UL grant for PUSCH scheduling from the BS.

The UE may transmit, to the BS, a PUSCH (e.g., a BFR-related PUSCH) scheduled based on the UL grant (S1450). For example, with reference to Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4, the UE may transmit, to the BS, a MAC-CE (or UCI) including a beam report including the BFR through a PUSCH. For example, as in Proposal 3, when a BFR-PUCCH overlaps a PUSCH allocated to a UE, the UE may transmit the PUSCH by piggybacking only UCI other than BFRQ information to the PUSCH.

For example, the operation of transmitting, by the UE (100/200 in FIGS. 17 to 21), a PUSCH scheduled based on the UL grant to the BS (100/200 in FIGS. 17 to 21) in step S1450 may be implemented by the apparatus of FIGS. 17 to 21 to be described later. For example, referring to FIG. 18, the one or more processors 102 may control the one or more transceivers 106 and/or the one or more memories 104 to transmit a PUSCH scheduled based on an UL grant. The one or more transceivers 106 may transmit, to the BS, the PUSCH scheduled based on the UL grant.

As described above, the aforementioned BS/UE signaling and operation (e.g., Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4 and/or FIG. 14) may be implemented by the apparatus (e.g., the apparatus of FIGS. 17 to 21) to be described later. For example, the BS may correspond to a transmission apparatus/first apparatus, the UE may correspond to a reception apparatus/second apparatus and an opposite case thereof may also be considered according to circumstances. For example, the aforementioned BS/UE signaling and operation (e.g., Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4 and/or FIG. 14) may be processed by the one or more processors (e.g., 102, 202) in FIG. 18. The aforementioned BS/UE signaling and operation (e.g., Method 1/Method 1-1/Method 1-2/Method 2/Method 3/Method 4 of Proposal 1 and/or Method 1/Method 2/Method 3 of Proposal 2 and/or Proposal 3 and/or Proposal X1/Proposal X2/Proposal X3/Proposal X4 and/or FIG. 14) may be stored in a memory (e.g., the one or more memories (e.g., 104, 204) in FIG. 18) in the form of an instruction/program (e.g., an instruction or an executable code) for driving at least one processor (e.g., 102, 202) in FIG. 18.

Hereinafter, the aforementioned embodiments are specifically described with reference to FIG. 15 from an operation of a UE. Methods described hereinafter are classified merely for convenience of description, and some elements of any one method may be substituted with some elements of another method or they may be mutually combined and applied.

FIG. 15 is a flowchart for describing a method of transmitting, by a UE, a scheduling request in a wireless communication system according to an embodiment of the present disclosure.

Referring to FIG. 15, the method of transmitting, by a UE, a scheduling request (SR) in a wireless communication system according to an embodiment of the present disclosure includes steps of receiving configuration information related to an SR (S1510) and transmitting an SR based on the configuration information (S1520).

In S1510, the UE receives, from a base station, configuration information related to a scheduling request (SR). The configuration information related to an SR may be based on the configuration information related to an SR in FIG. 14.

According to S1510, the operation of receiving, by the UE (100/200 in FIGS. 17 to 21), the configuration information related to a scheduling request (SR) from the base station (100/200 in FIGS. 17 to 21) may be implemented by the apparatus of FIGS. 17 to 21. For example, referring to FIG. 18, the one or more processors 102 may control the one or more transceivers 106 and/or the one or more memories 104 to receive the configuration information related to the scheduling request (SR) from the base station 200.

In S1520, the UE transmits at least one SR to the base station based on the configuration information.

According to an embodiment, the at least one SR may be based on overlapped SRs. A case where K SRs are configured to be transmitted in one slot according to SR periodicity may be taken as an example.

Based on at least one SR being overlapped with uplink control information (UCI) having another type, UCI bits in which a specific field related to the at least one SR and the UCI having another type are combined may be transmitted.

Based on the at least one SR being related to beam failure recovery (BFR), the specific field may represent beam failure recovery.

As a detailed example, based on any one of the overlapped SRs being related to beam failure recovery (BFR), the specific field may represent beam failure recovery.

According to an embodiment, based on the specific field representing a positive SR, the positive SR may be related to one SR based on the at least one SR. Based on the specific field representing a negative SR, the negative SR may be related to all SRs based on the at least one SR.

According to an embodiment, the UCI having another type may be based on at least one of HARQ information or channel state information (CSI).

According to an embodiment, the number of bits of the specific field may be based on the number of at least one SR. For example, the number of bits of the specific field may be determined based on the number of at least one SR (e.g., K) and a ceiling function.

Values of the specific field according to the number of bits may be related to any one of a positive SR for a specific SR, a negative SR for all SRs and the beam failure recovery (BFR) based on a preset order.

The preset order may be based on an ID related to the at least one SR. For example, the ID related to the at least one SR may include an ID (schedulingRequestResourceId) for a scheduling request resource.

In this case, the specific field may be configured as the number of bits to which a specific number of bits have been added in order to indicate an SR and BFR. The number of bits of the specific field may be based on the number of bits based on the number of at least one SR and a preset number of bits. The values of the specific field may represent 1) a positive SR or a negative SR and 2) positive beam failure recovery (positive BFR) or negative beam failure recovery (negative BFR).

According to an embodiment, the beam failure recovery (BFR) may be related to a beam failure of at least one secondary cell (SCell).

According to S1520, the operation of transmitting, by the UE (100/200 in FIGS. 17 to 21), at least one SR to the base station (100/200 in FIGS. 17 to 21) based on the configuration information may be implemented by the apparatus of FIGS. 17 to 21. For example, referring to FIG. 18, the one or more processors 102 may control the one or more transceivers 106 and/or the one or more memories 104 to transmit at least one SR to the base station 200 based on the configuration information.

The method may further include a step of transmitting a message related to the beam failure recovery (BFR). In the step, the UE transmits, to the base station, the message related to the beam failure recovery (BFR). The transmission of the message may be based on S1450 in FIG. 14.

According to an embodiment, the message may be based on a medium access control-control element (MAC-CE). The MAC-CE may include a field for at least one of i) an ID of the at least one SCell or ii) information related to a new beam.

According to the aforementioned step, the operation of transmitting, by the UE (100/200 in FIGS. 17 to 21), the message related to the beam failure recovery (BFR) to the base station (100/200 in FIGS. 17 to 21) may be implemented by the apparatus of FIGS. 17 to 21. For example, referring to FIG. 18, the one or more processors 102 may control the one or more transceivers 106 and/or the one or more memories 104 to transmit the message related to the beam failure recovery (BFR) to the base station 200.

Hereinafter, the aforementioned embodiments are specifically described with reference to FIG. 16 from an operation aspect of a base station. Methods described hereinafter are classified merely for convenience of description, and some elements of any one method may be substituted with some elements of another method and they may be mutually combined and applied.

FIG. 16 is a flowchart for describing a method of receiving, by a base station, a scheduling request in a wireless communication system according to another embodiment of the present disclosure.

Referring to FIG. 16, the method of receiving, by the base station, a scheduling request (SR) in a wireless communication system according to another embodiment of the present disclosure includes steps of transmitting configuration information related to an SR (S1610) and receiving an SR based on the configuration information (S1620).

In S1610, the base station transmits, to a UE, configuration information related to a scheduling request (SR). The configuration information related to an SR may be based on the configuration information related to an SR in FIG. 14.

According to S1610, the operation of transmitting, by the base station (100/200 in FIGS. 17 to 21), the configuration information related to a scheduling request (SR) to the UE (100/200 in FIGS. 17 to 21) may be implemented by the apparatus of FIGS. 17 to 21. For example, referring to FIG. 18, the one or more processors 202 may control the one or more transceivers 206 and/or the one or more memories 204 to transmit the configuration information related to a scheduling request (SR) to the UE 100.

In step S1620, the base station receives, from the UE, at least one SR based on the configuration information.

According to an embodiment, the at least one SR may be based on overlapped SRs. A case where K SRs are configured to be transmitted in one slot according to SR periodicity may be taken as an example.

Based on at least one SR being overlapped with uplink control information (UCI) having another type, UCI bits in which a specific field related to the at least one SR and the UCI having another type are combined may be transmitted. Based on the at least one SR being related to beam failure recovery (BFR), the specific field may represent beam failure recovery.

As a detailed example, based on any one of the overlapped SRs being related to beam failure recovery (BFR), the specific field may represent beam failure recovery.

According to an embodiment, based on the specific field representing a positive SR, the positive SR may be related to one SR based on the at least one SR. Based on the specific field representing a negative SR, the negative SR may be related to all SRs based on the at least one SR.

According to an embodiment, the UCI having another type may be based on at least one of HARQ information or channel state information (CSI).

According to an embodiment, the number of bits of the specific field may be based on the number of at least one SR. For example, the number of bits of the specific field may be determined based on the number of at least one SR (e.g., K) and a ceiling function.

Values of the specific field according to the number of bits may be related to any one of a positive SR for a specific SR, a negative SR for all SRs and BFR or the beam failure recovery (BFR) based on a preset order.

The preset order may be based on an ID related to the at least one SR. For example, the ID related to the at least one SR may include an ID (schedulingRequestResourceId) for a scheduling request resource.

In this case, the specific field may be configured as the number of bits to which a specific number of bits have been added in order to indicate an SR and BFR. The number of bits of the specific field may be based on the number of bits based on the number of at least one SR and a preset number of bits. The values of the specific field may represent 1) a positive SR or a negative SR and 2) positive beam failure recovery (positive BFR) or negative beam failure recovery (negative BFR).

According to an embodiment, the beam failure recovery (BFR) may be related to a beam failure of at least one secondary cell (SCell).

According to S1620, the operation of receiving, by the base station (100/200 in FIGS. 17 to 21), at least one SR based on the configuration information from the UE (100/200 in FIGS. 17 to 21) may be implemented by the apparatus of FIGS. 17 to 21. For example, referring to FIG. 18, the one or more processors 202 may control the one or more transceivers 206 and/or the one or more memories 204 to receive at least one SR based on the configuration information from the UE 100.

The method may further include a step of receiving a message related to the beam failure recovery (BFR). In the step, the base station receives, from the UE, a message related to the beam failure recovery (BFR). The transmission of the message may be based on S1450 in FIG. 14.

According to an embodiment, the message may be based on a medium access control-control element (MAC-CE). The MAC-CE may include a field for at least one of i) an ID of the at least one SCell or ii) information related to a new beam.

According to the aforementioned step, the operation of receiving, by the base station (100/200 in FIGS. 17 to 21), the message related to the beam failure recovery (BFR) from the UE (100/200 in FIGS. 17 to 21) may be implemented by the apparatus of FIGS. 17 to 21. For example, referring to FIG. 18, the one or more processors 202 may control the one or more transceivers 206 and/or the one or more memories 204 to receive the message related to the beam failure recovery (BFR) from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 illustrates a communication system 1 applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 18 illustrates wireless devices applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 19 illustrates a signal processing circuit applied to the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 20 illustrates another example of a wireless device applied to the present disclosure.

The wireless device may be implemented in various forms according to a use-case/service (refer to FIG. 17). Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 21 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the method and apparatus for transmitting and receiving scheduling requests in a wireless communication system according to an embodiment of the present disclosure are described as follows.

According to an embodiment of the present disclosure, beam failure recovery (BFR) can be performed based on an SR. Accordingly, beam failure recovery (BFR) can be effectively supported even for a secondary cell (SCell). Such an effect may be significant in a case where a high frequency band (e.g., 30 GHz) operates as a secondary cell (SCell).

The transmission of the SR related to the BFR in order to perform the BFR through the SR may need to be processed as having higher priority than another SR.

In relation this, according to an embodiment of the present disclosure, based on at least one SR being overlapped with uplink control information (UCI) having another type, UCI bits in which a specific field related to the at least one SR and the UCI having another type are combined are transmitted. Based on the at least one SR being related to beam failure recovery (BFR), the specific field represents the beam failure recovery.

Accordingly, if at least one SR (e.g., overlapped SRs) is multiplexed with another UCI, the occurrence of a beam failure may be preferentially reported. Furthermore, when an SR event and a BFR event simultaneously occur, ambiguity in a UE operation can be solved, and a beam failure recovery procedure (BFR procedure) can be more quickly initiated.

According to an embodiment of the present disclosure, the number of bits of the specific field may be based on the number of at least one SR. Values of the specific field according to the number of bits may be related to any one of a positive SR for a specific SR, a negative SR for all SRs and BFR or the beam failure recovery (BFR) based on a preset order.

A positive SR or beam failure recovery may be represented through one field. A BFR procedure may be initiated based on the existing SR field.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method of transmitting, by a user equipment (UE), a scheduling request (SR) in a wireless communication system, the method comprising:
   receiving, by the UE, configuration information related to a plurality of SRs; and
   transmitting, by the UE, the plurality of SRs based on the configuration information,
   wherein, based on the plurality of SRs overlapping with transmission of hybrid automatic repeat request (HARQ) information or Channel State Information (CSI):
      uplink control information (UCI) bits are transmitted, in which i) first bits related to the plurality of SRs and ii) HARQ information bits or CSI bits are combined,
      wherein the first bits related to the plurality of SRs represent i) one of the plurality of SRs as positive or ii) all of the plurality of SRs as negative,
      wherein, based on all values of all of the first bits being zero, the first bits represent a negative SR for the all of the plurality of SRs, and
      wherein, based on a first value of one of the first bits being a value other than zero:
         1) The first value of the one of the first bits related to the one of the plurality of SRs represents a positive SR for the one of the plurality of SRs, and
         2) based on the one of the plurality of SRs being the positive SR related to a beam failure recovery (BFR), the first value of the one of the first bits related to the plurality of SRs indicates the positive SR related to the BFR.

2. The method of claim 1,
   wherein a number of the first bits related to the plurality of SRs is based on a number of the plurality of SRs.

3. The method of claim 1,
   wherein each of the first bits is related to i) the positive SR or ii) the negative SR, based on a preset order.

4. The method of claim 3,
   wherein the preset order is an order based on an identifier (ID) related to the plurality of SRs.

5. The method of claim 1,
   wherein the BFR is related to a beam failure of at least one secondary cell (SCell).

6. The method of claim 5, further comprising transmitting a message related to the BFR,
wherein the message is based on a medium access control-control element (MAC-CE).

7. The method of claim 6,
wherein the MAC-CE includes a field for at least one of i) an identifier (ID) of the at least one SCell or ii) information related to a new beam.

8. A user equipment configured to transmit a scheduling request (SR) in a wireless communication system, the user equipment comprising:
one or more transceivers;
one or more processors configured to control the one or more transceivers; and
one or more memories operatively coupled to the one or more processors and storing instructions that, based on being executed by the one or more processors, perform operations comprising:
receiving configuration information related to a plurality of SRs; and
transmitting the plurality of SRs based on the configuration information,
wherein, based on the plurality of SRs overlapping with transmission of hybrid automatic repeat request (HARQ) information or Channel State Information (CSI):
uplink control information (UCI) bits are transmitted, in which i) first bits related to the plurality of SRs and ii) HARQ information bits or CSI bits are combined,
wherein the first bits related to the plurality of SRs represent i) one of the plurality of SRs as positive or ii) all of the plurality of SRs as negative,
wherein, based on all values of all of the first bits being zero, the first bits related to the plurality of SRs represent a negative SR for the all of the plurality of SRs, and
wherein, based on a first value of one of the first bits being a value other than zero:
1) the first value of the one of the first bits related to the one of the plurality of SRs represents a positive SR for the one of the plurality of SRs, and
2) based on the one of the plurality of SRs being the positive SR related to a beam failure recovery (BFR), the first value of the one of the first bits related to the plurality of SRs indicates the positive SR related to the BFR.

9. The user equipment of claim 8,
wherein the BFR is related to a beam failure of at least one secondary cell (SCell).

10. A method of receiving, by a base station (BS), a scheduling request (SR) in a wireless communication system, the method comprising:
transmitting, by the BS, configuration information related to a plurality of SRs, and
receiving, by the BS, the plurality of SRs based on the configuration information,
wherein, based on the plurality of SRs overlapping with transmission of hybrid automatic repeat request (HARQ) information or Channel State Information (CSI):
uplink control information (UCI) bits are transmitted, in which i) first bits related to the plurality of SRs and ii) HARQ information bits or CSI bits are combined,
wherein the first bits related to the plurality of SRs represent i) one of the plurality of SRs as positive or ii) all of the plurality of SRs as negative,
wherein, based on all values of all of the first bits being zero, the first bits related to the plurality of SRs represent a negative SR for the all of the plurality of SRs, and
wherein, based on a first value of one of the first bits being a value other than zero:
1) The first value of the one of the first bits related to the one of the plurality of SRs represents a positive SR for the one of the plurality of SRs, and
2) based on the one of the plurality of SRs being the positive SR related to a beam failure recovery (BFR), the first value of the one of the first bits related to the plurality of SRs indicates the positive SR related to the BFR.

* * * * *